US012715976B2

(12) United States Patent
Tada et al.

(10) Patent No.: US 12,715,976 B2
(45) **Date of Patent: *Aug. 25, 2026**

(54) POLYESTER FILM RECOVERY METHOD, RECYCLED POLYESTER PRODUCT, RECOVERY DEVICE, AND FUNCTIONAL LAYER REMOVAL AGENT

(71) Applicant: Mitsubishi Chemical Corporation, Tokyo (JP)

(72) Inventors: Kazunobu Tada, Nagahama (JP); Toshihiro Hiraki, Osaka (JP); Tomohiro Suzuki, Nagahama (JP); Kiyonori Kuroda, Nagahama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 844 days.

This patent is subject to a terminal disclaimer.

(21) Appl. No.: 17/954,081

(22) Filed: Sep. 27, 2022

(65) Prior Publication Data

US 2023/0045736 A1 Feb. 9, 2023

Related U.S. Application Data

(63) Continuation of application No. PCT/JP2021/008540, filed on Mar. 4, 2021.

(30) Foreign Application Priority Data

Mar. 31, 2020 (JP) ................................ 2020-065408
Dec. 16, 2020 (JP) ................................ 2020-208858
Dec. 16, 2020 (JP) ................................ 2020-208860
Dec. 16, 2020 (JP) ................................ 2020-208861

(51) Int. Cl.
*C08J 11/28* (2006.01)

(52) U.S. Cl.
CPC ............ *C08J 11/28* (2013.01); *C08J 2367/02* (2013.01)

(58) Field of Classification Search
USPC ........ 528/190, 193, 194, 196, 198; 521/48.5
See application file for complete search history.

(56) References Cited

U.S. PATENT DOCUMENTS

| | | | |
|---|---|---|---|
| 3,503,904 | A | 3/1970 | Dietz et al. |
| 4,003,881 | A | 1/1977 | Sidebotham et al. |
| 5,628,832 | A | 5/1997 | Graham et al. |
| 5,698,378 | A | 12/1997 | Kawamoto |
| 6,348,107 | B1 | 2/2002 | Whitton et al. |
| 2001/0020483 | A1 | 9/2001 | Yamaguchi et al. |
| 2005/0027023 | A1 | 2/2005 | Masuda et al. |
| 2010/0056413 | A1 | 3/2010 | Harry, Jr. et al. |
| 2018/0371204 | A1 | 12/2018 | Shimizu et al. |
| 2021/0187790 | A1 | 6/2021 | Ohara et al. |

FOREIGN PATENT DOCUMENTS

| | | | |
|---|---|---|---|
| JP | S51-115577 | A | 10/1976 |
| JP | S53-094381 | A | 8/1978 |
| JP | S54-066985 | A | 5/1979 |
| JP | H07-266337 | A | 10/1995 |
| JP | H108-146560 | A | 6/1996 |
| JP | H09-271748 | A | 10/1997 |
| JP | H11-060795 | A | 3/1999 |
| JP | 2000-025041 | A | 1/2000 |
| JP | 2001-502376 | A | 2/2001 |
| JP | 2001-228594 | A | 8/2001 |
| JP | 2001-310970 | A | 11/2001 |
| JP | 2001-350411 | A | 12/2001 |
| JP | 2002-265665 | A | 9/2002 |
| JP | 2004169005 | A * | 6/2004 |
| JP | 2005-132901 | A | 5/2005 |
| JP | 2005-298354 | A | 10/2005 |
| JP | 2005-321537 | A | 11/2005 |
| JP | 2006-088334 | A | 4/2006 |
| JP | 2009-291690 | A | 12/2009 |
| JP | 2010-065230 | A | 3/2010 |
| JP | 2020-090094 | A | 6/2020 |
| WO | 03/042288 | A1 | 5/2003 |

(Continued)

OTHER PUBLICATIONS

JP 2004169005 A Machine Translation (Year: 2004).*
Morrison Boyd Organic Chemistry (First Volume) 6th Edition (1994).
Extended European Search Report issued Mar. 21, 2024 for European Patent Application No. 21781708.9.
International Search Report issued in related International Patent Application No. PCT/JP2021/008540 dated May 18, 2021.
Official Action issued Oct. 19, 2021 in Japanese Application No. 2020-208858.
Official Action issued Feb. 22, 2022 in Japanese Application No. 2020-208858.

(Continued)

*Primary Examiner* — Terressa Boykin
(74) *Attorney, Agent, or Firm* — Morgan, Lewis & Bockius LLP

(57) ABSTRACT

A polyester film recovery method includes: a functional layer removing step (A) of cleaning a laminated polyester film including a polyester film having on a surface thereof a functional layer, with a cleaning agent, so as to remove the functional layer; and a recovering step (B) of recovering the polyester film, from which the functional layer has been removed, and the cleaning agent is selected from the following (1) to (3): (1) a cleaning agent containing an alkalinizing agent (a) and a compound (b) having at least one hydroxy group, (2) a cleaning agent containing an alkalinizing agent (a) and a compatibilizing agent (c), and (3) a cleaning agent containing an alcohol compound having an acidity constant (pKa) of 8.0 or more and 20.0 or less. A polyester film recovery method that can peel a functional layer and can recover the base material film, a recovery apparatus, and a functional layer removal agent can be provided.

24 Claims, No Drawings

(56) References Cited

FOREIGN PATENT DOCUMENTS

| | | | |
|---|---|---|---|
| WO | 2017/154098 | A1 | 9/2017 |
| WO | 2020/059516 | A1 | 3/2020 |

OTHER PUBLICATIONS

Official Action issued Oct. 19, 2021 in Japanese Application No. 2020-208860.
Official Action issued Feb. 22, 2022 in Japanese Application No. 2020-208860.
Third Party Submission issued Jan. 7, 2022 Japanese Application No. 2020-208858.
Notice of Allowance issued in corresponding Japanese Patent Application No. 2022-195060, dated Mar. 4, 2025.
Office Action issued in corresponding Chinese Patent Application No. 202180024927.7, dated Apr. 1, 2025.
Office Action issued in corresponding European Patent Application No. 21781708.9, dated Apr. 2, 2025.
Office Action issued in Indonesian Patent Application No. P00202210452, dated Jun. 21, 2024.
Notice of Reasons for Refusal issued in corresponding Japanese Patent Application No. 2020-208861, dated Oct. 12, 2021.
Notice of Reasons for Refusal issued in corresponding Japanese Patent Application No. 2020-208861, dated Feb. 15, 2022.
Notice of Reasons for Refusal issued in corresponding Japanese Patent Application No. 2020-208858, dated Oct. 12, 2021 (English Machine translation only).
Notice of Reasons for Refusal issued in corresponding Japanese Patent Application No. 2020-208860, dated Oct. 12, 2021 (English Machine translation only).
Notice of Reasons for Refusal issued in corresponding Japanese Patent Application No. 2020-208861, dated Jun. 28, 2022.
Notice of Reasons for Refusal issued in corresponding Japanese Patent Application No. 2020-208858, dated Feb. 15, 2022 (English Machine translation only).
Notice of Reasons for Refusal issued in corresponding Japanese Patent Application No. 2020-208860, dated Feb. 15, 2022 (English Machine translation only).
Decision of Refusal issued in corresponding Japanese Patent Application No. 2020-208858, dated Jun. 28, 2022.
Notice of Reasons for Refusal issued in corresponding Japanese Patent Application No. 2020-208860, dated Jun. 28, 2022.
Notice of Reasons for Refusal issued in corresponding Japanese Patent Application No. 2022-195060, dated Jun. 25, 2024.
Notice of Reasons for Refusal issued in corresponding Japanese Patent Application No. 2022-195060, dated Jul. 12, 2024.
Notice of Reasons for Refusal issued in corresponding Japanese Patent Application No. 2021-206471, dated Jul. 18, 2024.
Offer of Information issued in corresponding Korean Patent Application No. 10-2022-7033703, dated Sep. 23, 2024.
Third Party Submission issued in corresponding Japanese Patent Application No. 2020-208858, dated Jan. 7, 2022.
Third Party Submission issued in corresponding Japanese Patent Application No. 2020-208858, dated Oct. 20, 2022.
Third Party Submission issued in corresponding Japanese Patent Application No. 2021-206471, dated Aug. 22, 2024.
Third Party Submission issued in corresponding Japanese Patent Application No. 2020-208858, dated May 13, 2022.
Third Party Submission issued in corresponding Japanese Patent Application No. 2020-208858, dated May 27, 2022.
Third Party Submission issued in corresponding Japanese Patent Application No. 2022-195060, dated Nov. 9, 2023.
Third Party Submission issued in corresponding Japanese Patent Application No. 2021-206471, dated Nov. 22, 2023.
Third Party Submission issued in corresponding Japanese Patent Application No. 2021-206471, dated Nov. 9, 2023.
Office Action issued in Taiwanese Patent Application No. 110108493, dated Nov. 6, 2024.
Alkyl Halides, Organic Chemistry Sixth Edition, pp. 296-299.
Notice of sending the Opposition issued in Japanese Patent Application No. 2025-700290, dated Apr. 14, 2025.
Written Notice Patent Opposition for Japanese Patent No. 7550048, dated Mar. 11, 2025.
Office Action issued in corresponding Korean Patent Application No. 10-2022-7033703, dated Dec. 16, 2025.
Office Action issued in corresponding European Patent Application No. 21781708.9, dated Feb. 12, 2026.

* cited by examiner

POLYESTER FILM RECOVERY METHOD, RECYCLED POLYESTER PRODUCT, RECOVERY DEVICE, AND FUNCTIONAL LAYER REMOVAL AGENT

TECHNICAL FIELD

The present invention relates to a polyester film recovery method, a recycled polyester product, a recovery apparatus, and a functional layer removal agent.

BACKGROUND ART

Waste plastics have been processed by landfill, ocean disposal, incineration, and the like, but there is an increasing difficulty in securement of landfill sites, and ocean disposal causes environmental problems since plastics are not decomposed.

Waste plastics can be utilized as heat through incineration, which however causes a problem that discharge of carbon dioxide therefrom leads the global warming.

According to the increasing consciousness to the environmental problems in recent years, there is a demand of recycling of waste plastics, such as reuse and regeneration, and research and developments therefor have been actively made. Most plastics are produced from fossil fuels, and the establishment of the recycle method is also demanded from the standpoint of the effective use of resources.

A polyester film as one of plastic films is useful as a base material film, and is frequently used in the form of a laminated film having various functional layers laminated on one surface or both surfaces thereof. The functional layers include a hardcoat layer, a pressure-sensitive adhesive layer, a decorative layer, a light shielding layer, a polarizing layer, an ultraviolet ray shielding layer, and the like, and a laminated film having a material corresponding to the functional layer laminated on a polyester film has been used.

The laminated films after use have been scarcely reused, but are subjected to disposal, incineration, or the like.

In trying to recycle a laminated film having a functional layer laminated thereon directly through remelting, the material constituting the functional layer is mixed in the molten polymer, and causes an abnormal odor in extrusion and decrease in melt viscosity of the polymer, which becomes a factor of breakage in film formation.

Even if a film can be produced therefrom, deterioration of the quality thereof due to coloration, foreign matters, and the like cannot be avoided.

In the case where the functional layer is removed by peeling, such as physical scraping, and then melt-extruded, the remaining functional layer clogs the filter in the filtering process in extrusion, which may cause a problem of failure in normal film formation.

As a recycle method of a laminated film, for example, PTL 1 describes a technique using a laminated film including a base material film having on at least one surface thereof an easily soluble resin layer and a surface functional layer laminated in this order. The laminated film having this configuration after use is cleaned with a solvent that can dissolve only the easily soluble resin layer but does not dissolve the base material film, and thereby the base material film is to be separated and recovered from the laminated film. The separated and recovered material is remelted to enable regeneration of the resin composition constituting the base material film.

CITATION LIST

Patent Literature

PTL 1: JP 2004-169005 A

SUMMARY OF INVENTION

Technical Problem

The method described in PTL 1 assumes the laminated film including a base material film having on a surface thereof an easily soluble resin layer and a surface functional layer laminated in this order as described above, and the functional layer is to be removed through dissolution of the easily soluble resin layer.

Accordingly this technique lacks general versatility since most laminated polyester films having no easily soluble resin layer cannot be applied thereto.

In view of the circumstances, an object is to provide a polyester film recovery method that can peel the functional layer from the laminated polyester film having no easily soluble resin layer and can recover the base material film.

Solution to Problem

As a result of earnest investigation by the present inventors, it has been found that the use of a particular cleaning agent can remove the functional layer and can efficiently recover the polyester film as the base material. The present invention has been completed based on the knowledge.

The present invention includes the following embodiments.

[1] A polyester film recovery method including: a functional layer removing step (A) of cleaning a laminated polyester film including a polyester film having on a surface thereof a functional layer, with a cleaning agent (1) containing an alkalinizing agent (a) and a compound (b) having at least one hydroxy group, so as to remove the functional layer; and a recovering step (B) of recovering the polyester film, from which the functional layer has been removed.

[2] A polyester film recovery method including: a functional layer removing step (A) of cleaning a laminated polyester film including a polyester film having on a surface thereof a functional layer, with a cleaning agent (2) containing an alkalinizing agent (a) and a compatibilizing agent (c), so as to remove the functional layer; and a recovering step (B) of recovering the polyester film, from which the functional layer has been removed.

[3] The polyester film recovery method according to the item [2], wherein the compatibilizing agent (c) is at least one kind selected from the group consisting of an aromatic sulfonate salt and a hydroxy group-containing amine compound.

[4] The polyester film recovery method according to the item [2] or [3], wherein the cleaning agent (2) further contains a compound (b) having at least one hydroxy group.

[5] The polyester film recovery method according to the item [1] or [4], wherein the compound (b) having at least one hydroxy group is an alcohol compound.

[6] The polyester film recovery method according to the item [5], wherein the alcohol compound has an acidity constant (pKa) of 8.0 or more and 20.0 or less.

[7] The polyester film recovery method according to the item [5] or [6], wherein the alcohol compound has an acidity constant (pKa) of 10.0 or more and 20.0 or less.

[8] The polyester film recovery method according to any one of the items [5] to [7], wherein two or more kinds of the alcohol compounds are used in combination.

[9] The polyester film recovery method according to any one of the items [1] to [8], wherein the alkalinizing agent (a) contains an alkali metal hydroxide.

[10] The polyester film recovery method according to the item [9], wherein the alkali metal hydroxide contains potassium hydroxide.

[11] A polyester film recovery method including: a functional layer removing step (A) of cleaning a laminated polyester film including a polyester film having on a surface thereof a functional layer, with a cleaning agent (3) containing an alcohol compound having an acidity constant (pKa) of 8.0 or more and 20.0 or less, so as to remove the functional layer; and a recovering step (B) of recovering the polyester film, from which the functional layer has been removed.

[12] The polyester recovery method according to the item [11], wherein the cleaning agent (3) further contains an alkalinizing agent (a).

[13] The polyester film recovery method according to the item [11] or [12], wherein two or more kinds of the alcohol compounds are used in combination, and at least one kind of the alcohol compounds has an acidity constant (pKa) of 9.0 or more and 10.0 or less.

[14] The polyester film recovery method according to any one of the items [1] to [13], wherein the cleaning agent is an aqueous cleaning agent.

[15] The polyester film recovery method according to any one of the items [1] to [14], wherein the cleaning agent in the functional layer removing step (A) has a temperature of 20° C. or more.

[16] A recycled polyester product containing as at least a part of a raw material thereof a polyester film recovered by the recovery method according to any one of the items [1] to [15].

[17] A polyester film recovery apparatus including a cleaning device, the cleaning device cleaning a laminated polyester film including a polyester film having on a surface thereof a functional layer, with a cleaning agent, and recovering the polyester film, from which the functional layer has been removed, the cleaning agent being a cleaning agent (1) containing an alkalinizing agent (a) and a compound (b) having at least one hydroxy group.

[18] A polyester film recovery apparatus including a cleaning device, the cleaning device cleaning a laminated polyester film including a polyester film having on a surface thereof a functional layer, with a cleaning agent, and recovering the polyester film, from which the functional layer has been removed, the cleaning agent being a cleaning agent (2) containing an alkalinizing agent (a) and a compatibilizing agent (c).

[19] A polyester film recovery apparatus including a cleaning device, the cleaning device cleaning a laminated polyester film including a polyester film having on a surface thereof a functional layer, with a cleaning agent, and recovering the polyester film, from which the functional layer has been removed, the cleaning agent being a cleaning agent (3) containing an alcohol compound having an acidity constant (pKa) of 8.0 or more and 20.0 or less.

[20] The polyester film recovery apparatus according to any one of the items [17] to [19], wherein the recovery apparatus further includes a rinsing device rinsing out the cleaning agent attached to the polyester film, from which the functional layer has been removed.

[21] The polyester film recovery apparatus according to the item [20], wherein the cleaning agent is an aqueous cleaning agent, and the rinsing device rinses out the aqueous cleaning agent with water.

[22] The polyester film recovery apparatus according to any one of the items [17] to [21], wherein the recovery apparatus further includes a drying device drying the polyester film, from which the functional layer has been removed.

[23] The polyester film recovery apparatus according to any one of the items [17] to [22], wherein the recovery apparatus includes an unwinding device preceding the cleaning device.

[24] The polyester film recovery apparatus according to the item [23], wherein the polyester film is recovered by a roll-to-roll method.

[25] The polyester film recovery apparatus according to any one of the items [17] to [22], wherein the recovery apparatus further includes a cutting device preceding the cleaning device.

[26] A functional layer removal agent for a polyester film, for removing a functional layer from a laminated polyester film including a polyester film having on a surface thereof the functional layer, the removal agent (1) containing an alkalinizing agent (a) and a compound (b) having at least one hydroxy group.

[27] A functional layer removal agent for a polyester film, for removing a functional layer from a laminated polyester film including a polyester film having on a surface thereof the functional layer, the removal agent (2) containing an alkalinizing agent (a) and a compatibilizing agent (c).

[28] The functional layer removal agent for a polyester film according to the item [27], wherein the compatibilizing agent (c) is at least one kind selected from the group consisting of an aromatic sulfonate salt and a hydroxy group-containing amine compound.

[29] The functional layer removal agent for a polyester film according to the item [27] or [28], wherein the removal agent (2) further contains a compound (b) having at least one hydroxy group.

[30] The functional layer removal agent for a polyester film according to the item [26] or [29], wherein the compound (b) having at least one hydroxy group is an alcohol compound.

[31] The functional layer removal agent for a polyester film according to the item [30], wherein in the removal agent (1) or (2), the alcohol compound has an acidity constant (pKa) of 8.0 or more and 20.0 or less.

[32] The functional layer removal agent for a polyester film according to the item [30] or [31], wherein the alcohol compound has an acidity constant (pKa) of 10.0 or more and 20.0 or less.

[33] The functional layer removal agent for a polyester film according to any one of the items [30] to [32], wherein two or more kinds of the alcohol compounds are used in combination.

[34] The functional layer removal agent for a polyester film according to any one of the items [26] to [33], wherein the alkalinizing agent (a) contains an alkali metal hydroxide.

[35] The functional layer removal agent for a polyester film according to the item [34], wherein the alkali metal hydroxide contains potassium hydroxide.

[36] A functional layer removal agent for a polyester film, for removing a functional layer from a laminated polyester film including a polyester film having on a surface thereof the functional layer, the removal agent (3) containing an alcohol compound having an acidity constant (pKa) of 8.0 or more and 20.0 or less.

[37] The functional layer removal agent for a polyester film according to the item [36], wherein the removal agent (3) further contains an alkalinizing agent (a).

[38] The functional layer removal agent for a polyester film according to the item [36] or [37], wherein two or more kinds of the alcohol compounds are used in combination, and at least one kind of the alcohol compounds has an acidity constant (pKa) of 9.0 or more and 10.0 or less.

[39] The functional layer removal agent for a polyester film according to any one of the items [26] to [38], wherein the removal agent is an aqueous removal agent.

Advantageous Effects of Invention

According to the recovery method of the present invention, the functional layer can be easily removed from the laminated polyester film having the functional layer, and the base material film (polyester film) can be efficiently recovered.

DESCRIPTION OF EMBODIMENTS

First Embodiment

The laminated polyester film recovery method according to a first embodiment of the present invention includes: a functional layer removing step (A) of cleaning a laminated polyester film including a polyester film having on a surface thereof a functional layer, with a cleaning agent (1) containing an alkalinizing agent (a) and a compound (b) having at least one hydroxy group, so as to remove the functional layer; and a recovering step (B) of recovering the polyester film, from which the functional layer has been removed.

In the cleaning agent (1) according to the first embodiment, it is important to use the alkalinizing agent (a) and the compound (b) having at least one hydroxy group in combination in the functional layer removing step (A), and the combination use thereof can effectively remove the functional layer on the polyester film.

The mechanism of the effective removal of the functional layer by the combination use of the component (a) and the component (b) is not clear, and can be estimated as follows.

It is estimated that the reaction described below proceeds at the interface between the polyester film as the base material and/or the functional layer, and thereby the functional layer can be efficiently peeled from the laminated film.

In the case where the laminated film having a functional layer that undergoes hydrolysis, such as an acrylic pressure-sensitive adhesive layer and an acrylic hardcoat layer, is cleaned, an ester exchange reaction occurs at the ester bonding site of the functional layer and/or the base material with an alkoxide formed from the hydroxy group of the compound (b) having at least one hydroxy group, so as to provide a low molecular weight compound. Subsequently the ester bond of the low molecular weight compound receives a nucleophilic attack of a hydroxy group ionized from the alkalinizing agent (a) to cause a saponification reaction providing a carboxylate (ionization). It is estimated that the functional layer is eluted through the mechanism.

Even though a laminated film having a functional layer that does not undergo hydrolysis, such as a silicone release layer, is cleaned, the polyester film as the base material undergoes the decrease in molecular weight through the esterification reaction, the saponification, and the elution according to the aforementioned mechanism, and thus the functional layer laminated on the film can be peeled and removed.

Consequently it is considered that the functional layer can be efficiently peeled from the laminated film with the combination of the component (a) and the component (b).

Second Embodiment

The laminated polyester film recovery method according to a second embodiment of the present invention includes: a functional layer removing step (A) of cleaning a laminated polyester film including a polyester film having on a surface thereof a functional layer, with a cleaning agent (2) containing an alkalinizing agent (a) and a compatibilizing agent (c), so as to remove the functional layer; and a recovering step (B) of recovering the polyester film, from which the functional layer has been removed.

In the cleaning agent (2) according to the second embodiment, it is important to use the alkalinizing agent (a) and the compatibilizing agent (c) in combination in the functional layer removing step (A), and the combination use thereof can effectively remove the functional layer on the polyester film.

The mechanism of the effective removal of the functional layer by the combination use of the component (a) and the component (c) is not clear, and can be estimated as follows.

Specifically it is estimated that at the interface between the polyester film as the base material and the functional layer, a saponification reaction proceeds with a hydroxy group ionized from the alkalinizing agent to provide a carboxylate (ionization), and thereby the functional layer is peeled through swelling or eluted.

It is considered that the use of the compatibilizing agent enhances the compatibility of the cleaning agent component to facilitate the reaction, thereby facilitating the peel of the functional layer.

Third Embodiment

The laminated polyester film recovery method according to a third embodiment of the present invention includes: a functional layer removing step (A) of cleaning a laminated polyester film including a polyester film having on a surface thereof a functional layer, with a cleaning agent (3) containing an alcohol compound having an acidity constant (pKa) of 8.0 or more and 20.0 or less, so as to remove the functional layer; and a recovering step (B) of recovering the polyester film, from which the functional layer has been removed.

In the cleaning agent (3) according to the third embodiment, it is important to use the alcohol compound having an acidity constant (pKa) of 8.0 or more and 20.0 or less in the functional layer removing step (A), and the use thereof can effectively remove the functional layer on the polyester film.

The mechanism of the effective removal of the functional layer by the use of the alcohol compound is not clear, and can be estimated as follows.

It is estimated that in the case where the laminated film having a functional layer that undergoes hydrolysis, such as an acrylic pressure-sensitive adhesive layer and an acrylic hardcoat layer, is cleaned, an ester exchange reaction occurs at the ester bonding site of the functional layer and/or the base material with an alkoxide formed from the hydroxy group of the alcohol compound, and the decrease in molecular weight, the saponification, and the elution occur through the esterification reaction, thereby peeling and removing the functional layer laminated on the film.

It is considered that the alcohol compound having an acidity constant (pKa) of 8.0 or more and 20.0 or less efficiently forms the alkoxide, thereby facilitating the peel of the functional layer.

<Laminated Polyester Film>

The laminated polyester film in the present invention means a film including a polyester film as a base material film having laminated on a surface thereof a functional layer, such as a resin layer.

The polyester film may have a single layer structure or a multilayer structure. The multilayer structure may be a two-layer structure, a three-layer structure, or a four-layer or larger multilayer structure, and the number of layers is not particularly limited.

The polyester film may be a stretched film, such as a biaxially stretched film, or an unstretched film.

The polyester constituting the polyester film is not particularly limited, and a commercially available material may be appropriately used. Specific examples thereof include a polyester formed through polycondensation of a dicarboxylic acid and a diol, in which the dicarboxylic acid is preferably an aromatic dicarboxylic acid, and the diol is preferably an aliphatic glycol.

Examples of the aromatic dicarboxylic acid include terephthalic acid, 2,6-naphthalenedicarboxylic acid, isophthalic acid, and phthalic acid. Examples of the aliphatic glycol component include ethylene glycol, diethylene glycol, propylene glycol, butylene glycol, 1,4-cyclohexanedimethanol, and neopentyl glycol.

The polyester may be a homopolyester or a copolymer polyester.

The polyester may contain a third component as a copolymerization component in addition to the aromatic dicarboxylic acid and the glycol.

Specific examples of the polyester include polyethylene terephthalate, polyethylene-2,6-naphthalate, polybutylene terephthalate, and polybutylene-2,6-naphthalate, and among these, polyethylene terephthalate is preferred.

These materials may be a copolymer polyester, and for example, polyethylene terephthalate may have a dicarboxylic acid unit other than terephthalic acid in an amount of approximately 30% by mol or less of the dicarboxylic acid unit and may have a diol unit other than ethylene glycol in an amount of approximately 30% by mol or less of the diol unit.

The constitutional component of the functional layer is not particularly limited, and the functional layer is preferably constituted by a resin from the standpoint of the removal by the recovery method of the present invention. Examples of the functional layer include a hardcoat layer, a pressure-sensitive adhesive layer, a release layer, a decorative layer, a light shielding layer, an ultraviolet ray shielding layer, an adhesion promoting layer (primer layer), an antistatic layer, a refractive index regulating layer, and an oligomer blocking layer.

The hardcoat layer is a layer that is provided for imparting a scratch resistance and the like to the polyester film, and the material for forming the hardcoat layer is not particularly limited, examples of which include hardened materials of a monofunctional (meth)acrylate, a polyfunctional (meth) acrylate, and a reactive silicon compound, such as tetraethoxysilane.

The pressure-sensitive adhesive layer is a layer that is provided for adhering to another equipment or the like under pressure, and the material for constituting the pressure-sensitive adhesive layer is not particularly limited, examples of which include a known pressure-sensitive adhesive resin, such as an acrylic resin, a rubber resin, and a silicone resin.

The release layer is a layer that is provided for imparting a releasability to the polyester film, and for example, is a layer that is provided in a release film used as process paper for forming a green sheet used in the production of a ceramic electronic member, and an adhesion separator of an optical member used in the production of a flat panel display such as a polarizing plate and an optical filter. The material for constituting the release layer is not particularly limited, examples of which include a material mainly containing a curable silicone resin, a long-chain alkyl group-containing compound, such as a modified silicone resin obtained through graft polymerization with a urethane resin, an epoxy resin, or the like, a fluorine compound, and hydrocarbon wax.

The decorative layer is a layer that is provided for imparting a design property and the material for constituting the decorative layer is not particularly limited, examples of which include a polyurethane resin, a vinyl resin, a polyamide resin, a polyester resin, an acrylic resin, and a polyvinyl acetal resin. A pigment, a dye, or the like is added to the resin for decoration.

The light shielding layer or the ultraviolet ray shielding layer is a layer that is provided for shielding the content from an ultraviolet ray, a visible ray, or the like, and the material for constituting the light shielding layer or the ultraviolet ray shielding layer is not particularly limited, examples of which include the resins described for the decorative layer, an inorganic filler, such as calcium carbonate, talc, clay kaolin, silica, diatom earth, and barium sulfate, and an organic filler, such as wood powder, pulp powder, and cellulose powder.

The adhesion promoting layer (primer layer) is a layer that is provided for adhering another layer or film to the polyester film, and is not particularly limited, examples of which include a polyurethane resin, a vinyl resin, a polyamide resin, a polyester resin, an acrylic resin, and a polyvinyl acetal resin, and also a crosslinking agent and particles.

The antistatic layer is a layer that is provided for preventing static charge generated through contact with another material or peeling. The antistatic agent used in the antistatic layer is not particularly limited, examples of which include nonionic, cationic, anionic, and amphoteric surfactants, a conductive polymer, such as polypyrrole, polyaniline, poly (3,4-ethylenedioxythiophene), and poly(4-styrenesulfonate), a metal oxide filler, such as $SnO_2$ (Sb doped), $In_2O_3$ (Sn doped), and ZnO (Al doped), and a carbon compound, such as graphene, carbon black, and carbon nanotubes (CNT). These materials may be used alone or as a combination of two or more kinds thereof. The antistatic layer may also be formed of a resin composition containing an antistatic agent. Examples of the resin contained in the resin composition include a polyester resin, an acrylic resin, and a urethane resin.

The refractive index regulating layer is a layer that is provided for regulating the refractive index, and the material for constituting the refractive index regulating layer is not particularly limited, examples of which include a polyester resin, an acrylic resin, a urethane resin, a polycarbonate resin, an epoxy resin, an alkyd resin, a urea resin, a fluorine resin, and a metal oxide, such as zirconium oxide and titanium oxide. These materials may be used alone or as a combination of two or more kinds thereof.

The oligomer blocking layer is a layer that is provided for preventing whitening of the film after a heating process, and foreign matters, and is not particularly limited, and examples of the material for constituting the oligomer blocking layer include an amine compound and an ionic resin. The oligomer blocking layer may also be a highly crosslinked coating film or the like.

These functional layers each may be a single layer or may include two or more kinds of layers laminated.

In the case where two or more kinds of layers are laminated, it is preferred that at least one layer is a layer constituted by a resin.

<Cleaning Agent>

In the method of the present invention, a cleaning agent selected from the following (1) to (3) is used in the functional layer removing step (A):

- a cleaning agent (1) containing an alkalinizing agent (a) and a compound (b) having at least one hydroxy group,
- a cleaning agent (2) containing an alkalinizing agent (a) and a compatibilizing agent (c), and
- a cleaning agent (3) containing an alcohol compound having an acidity constant (pKa) of 8.0 or more and 20.0 or less.

(Alkalinizing Agent)

The alkalinizing agent (a) constituting the cleaning agent of the present invention alkalinizes the cleaning liquid, and may also be referred to as an alkaline agent. The alkalinizing agent may be either an inorganic alkalinizing agent or an organic alkalinizing agent.

Examples of the inorganic alkalinizing agent include a hydroxide of an alkali metal, such as sodium hydroxide, potassium hydroxide, rubidium hydroxide, and cesium hydroxide; a hydroxide of an alkaline earth metal, such as calcium hydroxide and barium hydroxide; a carbonate of an alkali metal, such as sodium carbonate and potassium carbonate; a phosphate of an alkali metal, such as trisodium phosphate, sodium pyrophosphate, sodium tripolyphosphate, sodium tetrapolyphosphate, tripotassium phosphate, potassium pyrophosphate, and potassium tripolyphosphate; a silicate of an alkali metal, such as sodium orthosilicate, sodium metasilicate, and potassium silicate; and ammonia.

The inorganic alkalinizing agent in the cleaning agent is preferably a hydroxide of an alkali metal, more preferably sodium hydroxide or potassium hydroxide from the standpoint of the availability and particularly preferably potassium hydroxide from the standpoint of the cleanability.

The inorganic alkalinizing agent in the cleaning agent may be used alone or as a combination of two or more kinds thereof. In particular, the combination use of potassium hydroxide and sodium hydroxide is preferred from the standpoint of the effects and the handleability.

Examples of the organic alkalinizing agent include an organic amine compound, such as N,N-bis(2-hydroxyethyl)-N-cyclohexylamine, diazabicycloundecene, diazabicyclononene, monomethylamine, dimethylamine, trimethylamine, monoethanolamine, diethanolamine, triethanolamine, morpholine, 2-(dimethylamino)ethanol, 2-(diethylamino)ethanol, 1-amino-2-propanol, and triisopropanolamine.

In the case where the cleaning agent (1) or (2) contains a compound having at least one hydroxy group as the organic alkalinizing agent, the compound that has an acidity constant (pKa) of 30 or more is treated as the alkalinizing agent.

The organic alkalinizing agent in the cleaning agent is preferably monoethanolamine, diethanolamine, or triethanolamine from the standpoint of the general versatility were preferably monoethanolamine or diethanolamine from the standpoint of the availability and particularly preferably monoethanolamine from the standpoint of the cleanability.

The cleaning agent (1) preferably contains an inorganic alkalinizing agent and an organic alkalinizing agent used in combination from the standpoint of the cleanability and specifically a combination of at least one kind of an inorganic alkalinizing agent of sodium hydroxide and potassium hydroxide and at least one kind of an organic alkalinizing agent selected from monoethanolamine, diethanolamine, triethanolamine, morpholine, 2-(dimethylamino)ethanol, 2-(diethylamino)ethanol, 1-amino-2-propanol, and triisopropanolamine is more preferred, and a combination of at least one kind of an inorganic alkalinizing agent selected from sodium hydroxide and potassium hydroxide and at least one kind of an organic alkalinizing agent selected from monoethanolamine and diethanolamine is particularly preferred.

The content of the alkalinizing agent in the total cleaning agent is preferably 1 to 50% by mass, more preferably 2 to 45% by mass, and further preferably 3 to 40% by mass. In the case where the content thereof is in the range, the sufficient effects as the cleaning agent can be obtained.

In the cleaning agent (2), the content of the alkalinizing agent in the total cleaning agent is preferably 1 to 20% by mass, more preferably 2 to 15% by mass, and further preferably 3 to 10% by mass. In the case where the content thereof is in the range, the sufficient effects as the cleaning agent can be obtained.

(Compound Having at Least One Hydroxy Group)

Examples of the compound (b) having at least one hydroxy group constituting the cleaning agent include an alcohol compound and a phenol compound.

Examples of the alcohol compound include a monohydric alcohol, such as hexafluoro-2-propanol, methyl alcohol, ethyl alcohol, propyl alcohol, butyl alcohol, benzyl alcohol, ethylene glycol monomethyl ether, diethylene glycol monobutyl ether, propylene glycol monomethyl ether, and propylene glycol monoethyl ether; a dihydric alcohol, such as ethylene glycol, diethylene glycol, and propylene glycol; and a polyhydric alcohol, such as glycerin.

Examples of the phenol compound include phenol, xylenol, salicylic acid, picric acid, naphthol, catechol, resorcinol, hydroquinone, pyrogallol, phloroglucinol, dibutylhydroxytoluene, bisphenol A, cresol, estradiol, eugenol, gallic acid, guaiacol, phenolphthalein, serotonin, dopamine, adrenaline, noradrenaline, thymol, tyrosine, and hexahydroxybenzene.

These compounds may be used alone or as a combination of two or more kinds thereof, and from the standpoint of enhancing the peeling and cleaning effect, two or more kinds thereof are preferably used in combination, and two or more kinds of the alcohol compounds are more preferably used in combination.

In the cleaning agent (1), a monohydric alcohol compound is preferred among these from the standpoint of retaining the cleanability while preventing the alkalinity of the cleaning agent from being impaired.

In particular, methyl alcohol, ethyl alcohol, propyl alcohol, and benzyl alcohol are preferred from the standpoint of the cleanability. These alcohols easily form an alkoxide through dissociation of a proton to achieve a high cleanability.

Benzyl alcohol is particularly preferred from the standpoint of the low volatility and the usable temperature range.

The monohydric alcohol compound specifically contributes to permeation and swelling to the coating film, and the case where two or more kinds of the monohydric alcohol compounds are used in combination is preferably a combination of a hydrophobic alcohol and a water soluble alcohol from the standpoint of exerting the peeling and cleaning effect widely and synergistically irrespective of the properties of the coating film. The hydrophobic alcohol means an alcohol that is not miscible with water and is separated therefrom into two layers, and the water soluble alcohol is an alcohol that is miscible with water to form one layer.

The hydrophobic alcohol is particularly preferably benzyl alcohol, and the water soluble alcohol is particularly preferably one or more kind selected from methyl alcohol, ethyl alcohol, and propyl alcohol.

In summary benzyl alcohol as the hydrophobic alcohol and at least one of methyl alcohol, ethyl alcohol, and propyl alcohol as the water soluble alcohol are more preferably used in combination, and benzyl alcohol and methyl alcohol are most preferably used in combination.

The blending ratio in the case where two or more kinds of the monohydric alcohol compounds are used in combination in terms of mass ratio of hydrophobic alcohol/water soluble alcohol is preferably 1/1 to 10/1, more preferably 1.5/1 to 9/1, and particularly preferably 2/1 to 8/1, from the standpoint of further enhancing the peeling and cleaning effect.

Even in the case where two or more kinds of the monohydric alcohol compounds are used in combination, a dihydric alcohol and a polyhydric alcohol may further be used in combination.

The acidity constant (pKa) of the alcohol compound is preferably in a range of 10.0 or more and 20.0 or less, more preferably 10.0 or more and 18.0 or less, further preferably 12.0 or more and 16.0 or less, particularly preferably 14.0 or more and 15.6 or less, and most preferably 14.0 or more and 15.4 or less, from the standpoint of the cleanability.

In the case where the acidity constant (pKa) of the alcohol compound is in the range, an alkoxide is formed without impairing the alkalinity of the cleaning agent, and thus the cleaning capability of the cleaning agent is enhanced.

The acidity constants (pKa) of some alcohol compounds are shown below: benzyl alcohol (pKa=15.4), methanol (pKa=15.5), ethanol (pKa=16.0), 1-propanol (pKa=16.1), 2-propanol (pKa=17.1), 1-butanol (pKa=16.1), and tert-butanol (pKa=18.0).

It can be said from the values of the acidity constants (pKa) of the alcohols shown above that an alcohol compound having an acidity constant (pKa) of 15.4 or less is an alcohol compound having a smaller acidity constant (pKa) than methanol.

The content of the compound (b) in the cleaning agent is preferably 10 to 99% by mass, more preferably 20 to 98% by mass, and further preferably 30 to 97% by mass. In the case where the content thereof is in the range, the amount of the alkalinizing agent (a) can be appropriate to suppress the foreign matter contamination or the like due to the deposition of the alkalinizing agent component in recovering the polyester film, and thereby the quality of the recycled polyester film can be retained.

In the case where the cleaning agent contains the component (c) in addition to the components (a) and (b) and the case where the cleaning agent is an aqueous cleaning agent, the content of the component (b) in the cleaning agent is preferably 10 to 90% by mass, more preferably 20 to 75% by mass, and further preferably 30 to 65% by mass. In the case where the content thereof is in the range, the amount of the compatibilizing agent can also be appropriate in addition to the alkalinizing agent (a). Furthermore, in the case where the aqueous cleaning agent is used, a certain amount or more of water may be contained.

Particularly preferred embodiments of the cleaning agent in the present invention include a combination of (W) or (X) and (Y) or (Z) from the standpoint of the cleanability.

(W) An alkali metal hydroxide, particularly sodium hydroxide or potassium hydroxide, is contained as the alkalinizing agent (a) (alkaline agent).

(X) An alkali metal hydroxide, particularly sodium hydroxide or potassium hydroxide, is contained, and an organic alkalinizing agent is also contained, as the alkalinizing agent (a) (alkaline agent).

(Y) At least methyl alcohol, ethyl alcohol, propyl alcohol, or benzyl alcohol, particularly benzyl alcohol, is contained as the compound (b) having at least one hydroxy group.

(Z) An alcohol compound having an acidity constant (pKa) in a range of 14.0 or more and 15.4 or less, i.e., an alcohol compound having a smaller acidity constant (pKa) than methanol, is contained as the compound (b) having at least one hydroxy group.

The cleaning agent (2) preferably contains the compound (b) having at least one hydroxy group. In the cleaning agent (2), the acidity constant (pKa) of the alcohol compound is preferably in a range of 8.0 or more and 20.0 or less, more preferably 8.0 or more and 18.0 or less, further preferably 9.0 or more and 16.0 or less, particularly preferably in a range of 9.0 or more and 15.6 or less, and most preferably 9.3 or more and 15.4 or less, from the standpoint of the cleanability.

In the case where the acidity constant (pKa) of the alcohol compound is in the range, an alkoxide is formed without impairing the alkalinity of the cleaning agent, and thus the cleaning capability of the cleaning agent is enhanced.

The acidity constants (pKa) of some alcohols are shown below: hexafluoro-2-propanol (pKa=9.3), benzyl alcohol (pKa=15.4), methanol (pKa=15.5), ethanol (pKa=16.0), 1-propanol (pKa=16.1), 2-propanol (pKa=17.1), 1-butanol (pKa=16.1), and tert-butanol (pKa=18.0).

It can be said from the values of the acidity constants (pKa) of the alcohols shown above that an alcohol compound having an acidity constant (pKa) of 15.4 or less is an alcohol compound having a smaller acidity constant (pKa) than methanol.

Furthermore, it can be said that an alcohol compound having an acidity constant (pKa) of 9.3 or more is an alcohol compound having an acidity constant (pKa) of hexafluoro-2-propanol or more.

Preferred Embodiment 1

Among the above, hexafluoro-2-propanol, methyl alcohol, ethyl alcohol, propyl alcohol, and benzyl alcohol are more preferred from the standpoint of the cleanability. These alcohol compounds easily form an alkoxide through dissociation of a proton to achieve a high cleanability. Among these, hexafluoro-2-propanol having a high cleanability is preferred.

The combination use of hexafluoro-2-propanol and another alcohol compound is also preferred for the purpose of regulating the cleaning capability. In this case, the combination use of hexafluoro-2-propanol and methyl alcohol, the combination use of hexafluoro-2-propanol and ethyl alcohol, and the combination use of hexafluoro-2-propanol and benzyl alcohol are preferred.

In the case where hexafluoro-2-propanol and another monohydric alcohol compound are used in combination as the alcohol compound, the mass ratio thereof (hexafluoro-2-propanol/another monohydric alcohol compound) is preferably 1/1 to 1/100, more preferably 1/3 to 1/41, further preferably 1/4 to 1/20, and particularly preferably 1/5 to 1/10.

Even in the case where two or more kinds of the monohydric alcohol compounds are used in combination, a dihydric alcohol and a polyhydric alcohol may further be used in combination.

Preferred Embodiment 2

Among the above, benzyl alcohol is preferably used from the standpoint of the low volatility and the usable temperature range.

Preferred Embodiment 3

Furthermore, in particular, two or more kinds thereof are preferably used in combination from the standpoint of enhancing the peeling and cleaning effect, and in the combination use of two or more kinds thereof, a combination of a hydrophobic monohydric alcohol and a water soluble monohydric alcohol is preferred from the standpoint of exerting the peeling and cleaning effect widely and synergistically irrespective of the properties of the coating film. The hydrophobic monohydric alcohol means a monohydric alcohol that is not miscible with water and is separated therefrom into two layers, and the water soluble monohydric alcohol is a monohydric alcohol that is miscible with water to form one layer.

Among the above, it is preferred that benzyl alcohol as the hydrophobic monohydric alcohol and one or more kinds selected from hexafluoro-2-propanol, methyl alcohol, ethyl alcohol, and propyl alcohol as the water soluble monohydric alcohol are used in combination, and in particular, it is most preferred that benzyl alcohol and hexafluoro-2-propanol are used in combination, or benzyl alcohol and methyl alcohol are used in combination.

The blending ratio in the case where two or more kinds of the alcohol compounds are used in combination is not particularly limited, and the mass ratio of hydrophobic monohydric alcohol/water soluble monohydric alcohol is preferably 1/1 to 20/1, more preferably 1/1 to 10/1, and further preferably 1.5/1 to 10/1, from the standpoint of further enhancing the peeling and cleaning effect.

Even in the case where two or more kinds of the monohydric alcohol compounds are used in combination, a dihydric alcohol and a polyhydric alcohol may further be used in combination.

In the cleaning agent, the content of the compound (b) having at least one hydroxy group is preferably 10 to 99% by mass, more preferably 20 to 98% by mass, and further preferably 30 to 97% by mass. In the case where the content is in the range, the amount of the alkalinizing agent (a) can be appropriate to suppress the foreign matter contamination or the like due to the deposition of the alkalinizing agent component in recovering the polyester film, and thereby the quality of the recycled polyester film can be retained.

In the case where the cleaning agent is an aqueous cleaning agent, the content of the component (b) in the cleaning agent is preferably 10 to 90% by mass, more preferably 20 to 75% by mass, and further preferably 30 to 65% by mass. In the case where the content thereof is in the range, the amount of the compatibilizing agent (c) can also be appropriate in addition to the alkalinizing agent (a), and thereby a certain amount or more of water can be contained.

In the cleaning agent (3), a cleaning agent containing an alcohol compound having an acidity constant (pKa) of 8.0 or more and 20.0 or less is used for cleaning in the functional layer removing step (A).

In the case where the acidity constant (pKa) of the alcohol compound is in the range, an alkoxide is formed without impairing the alkalinity of the cleaning agent, and thus the cleaning capability of the cleaning agent can be enhanced. The acidity constant (pKa) of the alcohol compound is preferably 8.0 or more and 18.0 or less, more preferably 9.0 or more and 16.0 or less, particularly preferably in a range of 9.0 or more and 15.6 or less, and most preferably 9.3 or more and 15.4 or less, from the standpoint of the cleanability.

Examples of the alcohol compound having an acidity constant (pKa) of 8.0 or more and 20.0 or less include hexafluoro-2-propanol (pKa=9.3), benzyl alcohol (pKa=15.4), methanol (pKa=15.5), ethanol (pKa=16.0), 1-propanol (pKa=16.1), 2-propanol (pKa=17.1), 1-butanol (pKa=16.1), and tert-butanol (pKa=18.0).

Among these, hexafluoro-2-propanol, methyl alcohol, ethyl alcohol, propyl alcohol, and benzyl alcohol having acidity constants (pKa) in an appropriate range are more preferred. Among these, hexafluoro-2-propanol having a high cleanability is particularly preferred.

The alcohol compounds may be used alone or as a combination of two or more kinds thereof. In particular, two or more kinds thereof are preferably used in combination from the standpoint of enhancing the peeling and cleaning effect.

In the case where two or more kinds of the alcohol compounds are used in combination, at least one kind of an alcohol compound having an acidity constant (pKa) of 9.0 or more and 10.0 or less is preferably contained, and in particular, the combination use of hexafluoro-2-propanol (pKa=9.3) and methyl alcohol, the combination use of hexafluoro-2-propanol and ethyl alcohol, and the combination use of hexafluoro-2-propanol and benzyl alcohol are preferred, from the standpoint of regulating the cleaning capability. Among the above, the combination use of hexafluoro-2-propanol and benzyl alcohol is particularly preferred from the standpoint of the low volatility and the usable temperature range.

The blending ratio in the case where two or more kinds of the alcohol compounds are used in combination in terms of mass ratio of alcohol compound having an acidity constant (pKa) of 9.0 or more and 10.0 or less/another preferred alcohol compound above is preferably 1/1 to 1/100, more preferably 1/3 to 1/41, further preferably 1/4 to 1/20, and particularly preferably 1/5 to 1/10, from the standpoint of further enhancing the peeling and cleaning effect.

An alcohol compound other than the aforementioned phenol compound and the aforementioned preferred alcohol compound may be used in combination.

Examples of the alcohol compound other than the aforementioned preferred alcohol compound include a monohydric alcohol, such as ethylene glycol monomethyl ether, diethylene glycol monobutyl ether, propylene glycol monomethyl ether, and propylene glycol monoethyl ether; a dihydric alcohol, such as ethylene glycol, diethylene glycol, and propylene glycol; and a polyhydric alcohol, such as glycerin.

The content of the alcohol compound and the phenol compound (which may be referred to as a "component (b)" individually or generically) in the cleaning agent is preferably 10 to 99% by mass, more preferably 20 to 98% by mass, and further preferably 30 to 97% by mass. In the case where the content thereof is in the range, the quality of the recycled polyester film can be retained.

The content of the alcohol compound having an acidity constant (pKa) of 8.0 or more and 20.0 or less in the component (b) is preferably 50 to 100% by mass, more preferably 60 to 100% by mass, and further preferably 70 to 100% by mass.

The cleaning agent (3) preferably contains the alkalinizing agent (a) described above. The component (a) has been described above, and the preferred embodiments of the alkalinizing agent (a) in the cleaning agent (3) are the same as in the cleaning agent (1).

In the case where the cleaning agent contains the component (c) in addition to the components (a) and (b) and the case where the cleaning agent is an aqueous cleaning agent, the content of the component (b) in the cleaning agent is preferably 10 to 90% by mass, more preferably 20 to 75% by mass, and further preferably 30 to 65% by mass. In the case where the content thereof is in the range, the amount of the compatibilizing agent (c) can also be appropriate in addition to the alkalinizing agent (a). Furthermore, in the case where the aqueous cleaning agent is used, a certain amount or more of water may be contained.

(Compatibilizing Agent)

In the cleaning agent (2), the compatibilizing agent (c) has a function of promoting the elution of the functional layer from the laminated polyester film by the combination use with the component (a), and simultaneously has a function of solubilizing the component (a), the component (b), an additive optionally added, and the like.

The compatibilizing agent (c) is not particularly limited, and any of an anionic compatibilizing agent, a cationic compatibilizing agent, a nonionic compatibilizing agent, and an amphoteric compatibilizing agent may be used.

The compatibilizing agent encompasses compounds that correspond to the alkalinizing agent, and therefore, in the cleaning agent of the present invention, the compatibilizing agent (c) used in combination with the alkalinizing agent (a) is a compound that is different from the alkalinizing agent (a).

Examples of the anionic compatibilizing agent include an alkylsulfonic acid, an alkylbenzenesulfonic acid, an alkylcarboxylic acid, an aromatic carboxylic acid, an alkylnaphthalenesulfonic acid, an α-olefinsulfonic acid, a dialkylsulfosuccinic acid, an α-sulfonated fatty acid, N-methyl-N-oleyltaurine, a petroleum sulfonic acid, an alkyl sulfate, sulfated fat and oil, a polyoxyethylene alkyl ether sulfate, polyoxyethylene stylenated phenyl ether sulfate, an alkylphosphoric acid, a polyoxyethylene alkyl ether phosphate, a polyoxyethylene alkyl phenyl ether phosphate, a naphthalenesulfonic acid formaldehyde condensate, and salts of these compounds.

Examples of the cationic compatibilizing agent include a quaternary ammonium, a tetraalkylammonium, a trialkylbenzylammonium, an alkylpyridinium, a 2-alkyl-1-alkyl-1-hydroxyethylimidazolinium, an N,N-dialkylmorpholinium, a polyethylene polyamine fatty acid amide, a urea condensate of a polyethylene polyamine fatty acid amide, a quaternary ammonium of a urea condensate of a polyethylene polyamine fatty acid amide, and salts of these compounds.

Examples of the nonionic compatibilizing agent include a polyoxyalkylene ether, such as a polyoxyethylene alkyl ether and a polyoxyethylene-polyoxypropylene alkyl ether; a polyoxyethylene alkyl phenyl ether, a polyoxyethylene polystylyl phenyl ether, a polyoxyethylene-polyoxypropylene glycol, a polyhydric alcohol fatty acid partial ester, a polyoxyethylene polyhydric alcohol fatty acid partial ester, a polyoxyethylene fatty acid ester, a polyglycerin fatty acid ester, a polyoxyethylenated castor oil, and an organic amine compound, such as a fatty acid diethanolamide, monomethylamine, dimethylamine, trimethylamine, monoethanolamine, diethanolamine, triethanolamine, morpholine, 2-(dimethylamino)ethanol, 2-(diethylamino)ethanol, 1-amino-2-propanol, triisopropanolamine, a polyoxyethylene alkylamine, a triethanolamine fatty acid partial ester, and a trialkylamine oxide.

Examples of the amphoteric compatibilizing agent include a betaine compound, such as an N,N-dimethyl-N-alkyl-N-carboxymethylammonium betaine, an N,N,N-trialkyl-N-sulfoalkyleneammonium betaine, an N,N-dialkyl-N,N-bispolyoxyethyleneammonium sulfate ester betaine, and a 2-alkyl-1-carboxymethyl-1-hydroxyethylimidazolinium betaine, and an aminocarboxylic acid, such as an N,N-dialkylaminoalkylenecarboxylic acid.

While the compound (b) having at least one hydroxy group may be included in the compatibilizing agent in some cases, an alkanolamine compound, an alkanolamide compound, and a hydroxy compound having 12 or more carbon atoms corresponding to the following are treated as the compatibilizing agent (c).

Examples of the alkanolamine compound include monoethanolamine, diethanolamine, and triethanolamine, and examples of the alkanolamide compound include monoethanolamide, diethanolaminde, and triethanolamide.

Examples of the hydroxy compound having 12 or more carbon atoms include polyoxyethylene alkyl ether based, thioether based, polyoxyalkylene glycol based, acetylene glycol based, ester based, and glycoside based hydroxy compounds having 12 or more carbon atoms.

The compatibilizing agent (c) used in the cleaning agent is preferably an aromatic sulfonate salt and a hydroxy group-containing amine compound from the standpoint of the compatibility and the handleability. Specific examples of the compounds include sodium benzenesulfonate, sodium toluenesulfonate, sodium 2,4-dimethylbenzenesulfonate, sodium 2-naphthalenesulfonate, and an alkanolamine, such as monoethanolamine, diethanolamine, and triethanolamine. Among these, the aromatic sulfonate salt having a high boiling point is preferably used from the standpoint of raising the heating upper limit of the cleaning liquid.

As described above, it is premised that a compound different from the alkalinizing agent (a) is used herein.

As a specific example of the combination of the alkalinizing agent (a) and the compatibilizing agent (c), in the case where an inorganic alkalinizing agent is used as the alkalinizing agent (a), it suffices that the compatibilizing agent (c) used is at least one of an anionic compatibilizing agent, a cationic compatibilizing agent, a nonionic compatibilizing agent, and an amphoteric compatibilizing agent. In the case where an organic alkalinizing agent is used as the alkalinizing agent (a), it suffices that the compatibilizing agent (c) used is at least one of an anionic compatibilizing agent, a cationic compatibilizing agent, a nonionic compatibilizing agent other than an organic amine compound, and an amphoteric compatibilizing agent.

In the cleaning agent, it is preferred that an inorganic alkalinizing agent is used as the alkalinizing agent (a), and at least one kind selected from an aromatic sulfonate salt and a hydroxy group-containing amine compound is used as the compatibilizing agent (c).

In particular, a combination of at least one kind of the inorganic alkalinizing agent selected from sodium hydroxide and potassium hydroxide and an aromatic sulfonate salt, such as sodium 2,4-dimethylbenzenesulfonate is preferred. A combination of at least one kind of the inorganic alkalinizing agent selected from sodium hydroxide and potassium hydroxide and at least one kind of a hydroxy group-containing amine compound selected from monoethanolamine, diethanolamine, triethanolamine, morpholine, 2-(dimethylamino)ethanol, 2-(diethylamino)ethanol, 1-amino-2-propanol, and triisopropanolamine is preferred, and therein, a combination of at least one kind selected from sodium hydroxide and potassium hydroxide as the inorganic alkalinizing agent and at least one kind of a hydroxy group-containing amine compound selected from monoethanolamine and diethanolamine is particularly preferred.

Two or more kinds of the compatibilizing agents may be used in combination from the standpoint of compatibilizing various additives in the cleaning agent inclusively.

The content of the compatibilizing agent in the cleaning agent is preferably in a range of 1 to 30% by mass. In the case where the content thereof is in the range, a sufficient cleanability can be obtained. In this standpoint, the content of the compatibilizing agent in the cleaning agent is more preferably in a range of 5 to 25% by mass, and further preferably in a range of 8 to 20% by mass.

The cleaning agent in the present invention is preferably an aqueous cleaning agent. The aqueous cleaning agent is obtained by dissolving the aforementioned components in water or by diluting the components with water. The aqueous cleaning agent has relatively high safety since the flashing point thereof can be increased, and is also advantageous since water can be used in a rinsing step described later.

The cleaning agent in the present invention may further contain various additives in addition to the aforementioned components, and examples thereof that may be added include a surfactant, an antioxidant, a rust inhibitor, a pH modifier, an antiseptic, a viscosity modifier, and a defoaming agent.

(Surfactant)

The surfactant is a component that solubilizes the components (a) and (b) and the additives and the like optionally added in the cleaning agents (1) and (3), and representative examples thereof include the following compounds.

The surfactant is not particularly limited, and any of an anionic surfactant, a cationic surfactant, a nonionic surfactant, and an amphoteric surfactant may be used.

Examples of the anionic surfactant include an alkylsulfonic acid, an alkylbenzenesulfonic acid, an alkylcarboxylic acid, an alkylnaphthalenesulfonic acid, an α-olefinsulfonic acid, a dialkylsulfosuccinic acid, an α-sulfonated fatty acid, N-methyl-N-oleyltaurine, a petroleum sulfonic acid, an alkyl sulfate, sulfated fat and oil, a polyoxyethylene alkyl ether sulfate, polyoxyethylene stylenated phenyl ether sulfate, an alkylphosphoric acid, a polyoxyethylene alkyl ether phosphate, a polyoxyethylene alkyl phenyl ether phosphate, a naphthalenesulfonic acid formaldehyde condensate, and salts of these compounds.

Examples of the cationic surfactant include a quaternary ammonium, a tetraalkylammonium, a trialkylbenzylammonium, an alkylpyridinium, a 2-alkyl-1-alkyl-1-hydroxyethylimidazolinium, an N,N-dialkylmorpholinium, a polyethylene polyamine fatty acid amide, a urea condensate of a polyethylene polyamine fatty acid amide, a quaternary ammonium of a urea condensate of a polyethylene polyamine fatty acid amide, and salts of these compounds.

Examples of the nonionic surfactant include a polyoxyalkylene ether, such as a polyoxyethylene alkyl ether and a polyoxyethylene-polyoxypropylene alkyl ether; a polyoxyethylene alkyl phenyl ether, a polyoxyethylene polystylyl phenyl ether, a polyoxyethylene-polyoxypropylene glycol, a polyhydric alcohol fatty acid partial ester, a polyoxyethylene polyhydric alcohol fatty acid partial ester, a polyoxyethylene fatty acid ester, a polyglycerin fatty acid ester, a polyoxyethylenated castor oil, a fatty acid diethanolamide, a polyoxyethylene alkylamine, a triethanolamine fatty acid partial ester, and a trialkylamine oxide.

Examples of the amphoteric surfactant include a betaine compound (such as an N,N-dimethyl-N-alkyl-N-carboxymethylammonium betaine, an N,N,N-trialkyl-N-sulfoalkyleneammonium betaine, an N,N-dialkyl-N,N-bispolyoxyethyleneammonium sulfate ester betaine, and a 2-alkyl-1-carboxymethyl-1-hydroxyethylimidazolinium betaine) and an aminocarboxylic acid (such as an N,N-dialkylaminoalkylenecarboxylic acid).

(Antioxidant)

The antioxidant is not particularly limited, and an amine antioxidant, a phenol antioxidant, and the like may be used.

(Rust Inhibitor)

Examples of the rust inhibitor include an inorganic compound, such as a chromate salt, a molybdate salt, and sodium nitrite.

(pH Modifier)

Examples of the pH modifier include lactic acid, carbon dioxide, succinic acid, gluconic acid, citric acid, trisodium citrate, malic acid, and phosphoric acid.

(Antiseptic)

Examples of the antiseptic include a paraben compound, benzoic acid, sodium benzoate, sorbic acid, a propionate salt compound, dehydroacetic acid, sulfur dioxide, and a sodium pyrosulfite compound.

(Viscosity Modifier)

Examples of the viscosity modifier include a polymer compound and lamellar inorganic particles.

(Defoaming Agent)

Examples of the defoaming agent include a fluorine compound, a silicone compound, a polyether compound, and a chelating agent, represented by an acetylene glycol compound and EDTA.

<Functional Layer Removing Step (A)>

The functional layer removing step in the present invention is a step of removing the functional layer of the laminated film with the cleaning agent. Examples of the method of removing include an immersing method of immersing in a cleaning tank having the cleaning agent placed therein, a coating method of coating the cleaning agent in the form of a solution, and a spraying method of spraying the cleaning agent in the form of a solution or the vaporized cleaning agent. Among these, an immersing method is preferred from the standpoint of the permeability of the cleaning agent to the functional layer.

The temperature of the cleaning agent in the immersing method is preferably room temperature (20° C.) or more. In the case where the temperature thereof is room temperature (20° C.) or more, the cleaning liquid has a low viscosity which facilitates permeation to the functional layer to provide a favorable cleanability. In this standpoint, the temperature of the cleaning agent in the immersing method is more preferably 40° C. or more, further preferably 50° C. or more, and particularly preferably 60° C. or more.

The upper limit value of the temperature of the cleaning agent in the case where the cleaning agent is used in the form of a solution is preferably a temperature of the boiling point or less. For the aqueous cleaning agent as a preferred embodiment of the present invention, the temperature is preferably 100° C. or less, and more preferably 90° C. or less.

The temperature of the cleaning liquid in cleaning may be the same as above in other methods than the immersing method. In the peeling and cleaning by the immersing method, microwave irradiation may be performed for the purpose of facilitating the hydrolysis reaction.

The pH of the cleaning agent is preferably 12 or more, and more preferably 13 or more, from the standpoint of the cleanability.

The immersion time is preferably regulated appropriately corresponding to the kind of the cleaning target.

In the case where the cleaning target is a polyester film having an acrylic pressure-sensitive adhesive layer provided as the functional layer, the immersion time is preferably 1 second or more and 30 minutes or less. In the case where the immersion time is 1 second or more, the cleaning agent sufficiently permeates the functional layer to exert the cleanability. In the case where the immersion time is 30 minutes or less, the polyester film as the base material is not excessively dissolved to secure the amount of the resulting polyester in recovery. In this standpoint, the immersion time is more preferably 15 seconds or more and 20 minutes or less, further preferably 30 seconds or more and 15 minutes or less, and particularly preferably 1 minute or more and 10 minutes or less.

In the case where the cleaning target is a polyester film having an acrylic hardcoat layer provided as the functional layer, the immersion time is preferably 1 second or more and 30 minutes or less. In the case where the immersion time is 1 second or more, the cleaning agent sufficiently permeates the functional layer to exert the cleanability. In the case where the immersion time is 30 minutes or less, the polyester film as the base material is not excessively dissolved to secure the amount of the resulting polyester in recovery. In this standpoint, the immersion time is more preferably 15 seconds or more and 30 minutes or less, further preferably 30 seconds or more and 25 minutes or less, and particularly preferably 1 minute or more and 20 minutes or less.

In the case where the cleaning target is a polyester film having a silicone release layer provided as the functional layer, the immersion time is preferably 1 second or more and 30 minutes or less. In the case where the immersion time is 1 second or more, the cleaning agent sufficiently permeates the functional layer to exert the cleanability. In the case where the immersion time is 30 minutes or less, the polyester film as the base material is not excessively dissolved to secure the amount of the resulting polyester in recovery. In this standpoint, the immersion time is more preferably 15 seconds or more and 20 minutes or less, further preferably 30 seconds or more and 10 minutes or less, and particularly preferably 1 minute or more and 5 minutes or less.

The specific embodiment of the functional layer removing step depends on the form of the laminated film as the waste material.

In the case where the laminated polyester film as the waste material is in a roll form, it is preferred that an unwinding device is provided preceding the cleaning tank having the cleaning agent placed therein, and the laminated film is wound off from the device, and introduced to the cleaning tank for cleaning. It is preferred that the polyester film is continuously transferred to the subsequent recovering step (B).

In the course of from the functional layer removing step to the rinsing step described later, a device equipped with a physical means, such as a roll brush, ultrasonic wave, microbubbles or nanobubbles, a water current, or compressed cold air, may be provided for the purpose of efficiently removing the functional layer from the laminated polyester film.

In the case where the laminated polyester film as the waste material is in a bulk form, it is preferred that a cutting device is provided preceding the cleaning step, and the laminated film is cut into a flake form, and introduced to the cleaning tank. With the flake form, the contact area between the laminated polyester film and the cleaning agent is increased to facilitate the penetration of the cleaning agent, and thus the functional layer can be efficiently removed. This embodiment preferably uses a method of introducing the laminated polyester film in a flake form continuously to the cleaning tank with a belt conveyer or the like. According to the embodiment, the cleaning can be performed with high productivity. In this embodiment, the cleaning may be performed in a batchwise manner.

<Recovering Step (B)>

After the functional layer removing step (A), the polyester film as the base material is recovered. A rinsing step and a drying step described later are preferably provided as the preceding steps of the recovering step. The method of recovering may be appropriately selected depending on the form of the laminated polyester film as the waste material.

In the case where the laminated polyester film as the waste material is in a roll form, the polyester film may be recovered continuously by a roll-to-roll method, and may be wound up after the cleaning step, the rinsing step, and the drying step, thereby efficiently recovering.

In the case where the laminated polyester film as the waste material is in a bulk form, the cutting step is preferably provided before the functional layer removing step as described above. In this embodiment, it is preferred that the polyester in a flake form is recovered by continuously passing through the rinsing step and the drying step with a belt conveyer or the like.

It is advantageous from the standpoint of the handleability that the polyester film thus recovered in the aforementioned manner is formed into pellets.

<Rinsing Step>

In the present invention, a rinsing step of rinsing out the cleaning agent is preferably provided after the functional layer removing step (A) and before the recovering step (B). Specifically the rinsing step means a step of rinsing out the cleaning agent attached to the polyester film, from which the functional layer has been removed, with a rinsing liquid.

The rinsing liquid is not particularly limited, as far as the cleaning agent can be rinsed out therewith. In the case where the aqueous cleaning agent as a preferred embodiment of the present invention is used, water can be used in the rinsing step.

The temperature in the rinsing step is preferably around room temperature, and specifically is preferably 5 to 50° C., and more preferably 5 to 30° C., from the standpoint of efficiently rinsing out.

Examples of the method of rinsing out the cleaning agent include a spraying method of spraying the rinsing liquid onto the polyester film, from which the functional layer has been removed, and an immersing method of immersing the polyester film in a rinsing tank having the rinsing liquid placed therein. In the case where the cleaning agent that is not necessarily rinsed out is used, the rinsing step can be omitted.

<Drying Step>

A drying step is preferably performed after the rinsing step. The cleaning agent and/or the rinsing liquid remaining on the polyester film can be removed by the drying step. In the case where the rinsing step is omitted, the drying step may be performed after the functional layer removing step (A).

The condition of the drying step is not particularly limited, and the polyester film is generally dried at 70 to 150° C. for a period of time of approximately 1 to 30 minutes. The drying method used may be an ordinary method, such as drying by heating with an infrared heater, an oven, or the like, hot air drying with a hot air dryer or the like, and drying by microwave heating.

<Recycled Polyester Product>

The polyester film obtained by the recovering method of the present invention can be used as a raw material of a polyester, and can be reused as a so-called recycled polyester product. Specifically, the recovered polyester can be pelletized and stored as a polyester in a pellet form (polyester product). The recovered polyester can also be molded into various polyester products, such as a polyester film, through melt extrusion or the like.

It is preferred that the recovered polyester is once pelletized and then molded into various products from the standpoint of the productivity thereof.

The recycled polyester can be applied to the same applications as the ordinary polyester products, and for example, can be used as a polyester film as a base material film. A functional layer may be formed on the base material film, so that the recycled polyester can be reused as a laminated film.

The recycled polyester can also be used after mixing with a polyester produced by the ordinary method, and can also be formed into a multilayer film using the recycled polyester and a polyester produced by the ordinary method.

The recycled polyester product may also be applied to various applications in addition to the films, and for example, PET bottles, polyester fibers, polyester sheets, polyester containers, and the like can be produced therewith.

The functional layer having been peeled therefrom can also be recovered and reused depending on necessity.

<Functional Layer Removal Agent>

Another embodiment of the present invention provides a removal agent for removing a functional layer from a laminated polyester film including a polyester film having on a surface thereof the functional layer (which may also be referred to as a "present removal agent").

The functional layer removal agent for a polyester film according to the present invention is the cleaning agent used in the functional layer removing step (A) in the polyester film recovery method described above that is used for removing the functional layer from the laminated polyester film.

The specific embodiments and the preferred embodiments of the present removal agent are the same as for the cleaning agent, all of which can be referred herein.

The present removal agent can easily remove the functional layer from the laminated polyester film, and the polyester film can be efficiently recovered from the laminated polyester film.

<Production Method of Recycled Polyester>

Another embodiment of the present invention provides a production method of a recycled polyester (which may also be referred to as a "present production method"), including:

a functional layer removing step (A) of cleaning a laminated polyester film including a polyester film having on a surface thereof a functional layer, with a particular cleaning agent, so as to remove the functional layer; and a recovering step (B) of recovering the polyester film, from which the functional layer has been removed.

Specifically a first embodiment of the present production method includes a functional layer removing step (A) and a recovering step (B), the functional layer removing step (A) includes a step of cleaning a laminated polyester film including a polyester film having on a surface thereof a functional layer, with a cleaning agent (1) containing an alkalinizing agent (a) and a compound (b) having at least one hydroxy group, so as to remove the functional layer, and the recovering step (B) includes a step of recovering the polyester film, from which the functional layer has been removed.

A second embodiment of the present production method includes a functional layer removing step (A1) and a recovering step (B), the functional layer removing step (A1) includes a step of cleaning a laminated polyester film including a polyester film having on a surface thereof a functional layer, with a cleaning agent (2) containing an alkalinizing agent (a) and a compatibilizing agent (c), so as to remove the functional layer, and the recovering step (B) includes a step (B) of recovering the polyester film, from which the functional layer has been removed.

A third embodiment of the present production method includes a functional layer removing step (A2) and a recovering step (B), the functional layer removing step (A2) includes a step of cleaning a laminated polyester film including a polyester film having on a surface thereof a functional layer, with a cleaning agent (3) containing an alcohol compound having an acidity constant (pKa) of 8.0 or more and 20.0 or less, so as to remove the functional layer, and the recovering step (B) includes a step (B) of recovering the polyester film, from which the functional layer has been removed.

The present production methods of the first to third embodiments each preferably further include a producing step (C) of producing a recycled polyester product from the polyester film recovered in the recovering step (B) as a raw material.

The producing step (C) more preferably includes a pellet producing step of pelletizing the polyester film, from which the functional layer has been removed.

The present production method is used for applying the polyester film recovery method described above to the production of a recycled polyester.

Accordingly the specific embodiments and the preferred embodiments of the present production method are the same as for the polyester film recovery method described above, all of which can be referred herein.

According to the present production method, the polyester film can be efficiently recovered by easily removing the functional layer from the laminated polyester film, and a recycled polyester product can be produced from the recovered polyester film as a raw material.

<Polyester Film Recovery Apparatus>

The polyester film recovery apparatus according to the present invention includes a cleaning device. The recovery apparatus recovers the polyester film, which has been cleaned with the cleaning device to remove the functional layer therefrom.

The means of recovering the polyester film is not particularly limited, and in the case where the polyester film is in a roll form, a winding roll of recovering the polyester film, from which the functional layer has been removed, may be used.

In the case where the polyester film is in a bulk form, the polyester film, from which the functional layer has been removed, may be recovered by conveying with a conveying device, such as a belt conveyer, to the prescribed recovery site.

The means of unwinding the polyester film and the means of cutting the polyester film are not particularly limited, and in the case where the polyester film is in a roll form, an unwinding device is preferably provided, and a so-called roll-to-roll system that performs winding up also with a roll is preferred since the polyester film can be efficiently recovered.

In the case where the polyester film is in a bulk form, a cutting device is preferably provided. The waste material is formed into a flake form by cutting, and the cleaning step can be performed efficiently as described above.

The recovery apparatus preferably includes a pellet producing device, and the recovered polyester film is preferably pelletized with the pellet producing device for enhancing the handleability. In particular, the polyester film recovered from a waste material in a bulk form can be further enhanced in handleability through pelletization.

The recovery apparatus preferably includes a rinsing device and a drying device described in detail below.

(Cleaning Device)

The cleaning device is a device of cleaning with the cleaning agent. Typical examples thereof include a cleaning tank filled with the cleaning agent, to which the laminated polyester film as the waste material is introduced and immersed therein for cleaning. Examples thereof also include a coating device of coating the cleaning agent in the form of a solution, and a spraying device of spraying the cleaning agent in the form of a solution or in a vaporized state, or forming mist of the cleaning agent and spraying the mist.

The cleaning agent has been described above, and the cleaning agent is preferably the aqueous cleaning agent. The aqueous cleaning agent is preferably used since the rinsing can be performed with water in the rinsing device described later.

(Rinsing Device)

The rinsing device is a device for rinsing out the cleaning agent attached to the polyester film after removing the functional layer with the cleaning agent. Specific examples thereof include a spraying device of spraying a rinsing liquid, and an immersing device of immersing in a rinsing liquid. The rinsing step can be performed with water by using the aqueous cleaning agent as the cleaning agent as described above, which provides high safety and is advantageous in cost since an explosion-proof device or the like is not necessarily provided.

The functional layer peeled from the polyester film may also be rinsed off simultaneously with the cleaning agent in some cases. Water and the material constituting the functional layer are separated thereafter and, water can be reused in the rinsing step, and the material constituting the functional layer can also be reused. The rinsing device may be omitted.

(Drying Device)

The drying device is for drying the polyester film, from which the functional layer is peeled, and the cleaning agent is rinsed off, and the drying condition has been described above. Examples of the drying device include an infrared heater, an oven, a hot air dryer, and a microwave heating dryer. The polyester base material is recovered after subjecting to the drying step with the drying device. Even in the case where the rinsing device is omitted, the polyester film, from which the functional layer has been peeled, may be dried with the drying device.

EXAMPLES

The present invention will be described in more detail with reference to examples. However, the present invention is not limited to the examples described below.

<Evaluation Methods>

(1) Immersion Test

The cleaning agents prepared in Examples and Comparative Examples each were placed in a 30 mL tank, in which a laminated film was immersed. The temperature of the cleaning agent, the immersion time, and the specimen size were as shown in the tables.

(2) Evaluation of Peeling of Functional Layer (2-1) Visual Evaluation (Laminated Polyester Film Having Pressure-Sensitive Adhesive Layer and Laminated Polyester Film Having Hardcoat Layer)

The immersed laminated film was taken out, and the surface thereof was visually observed and evaluated by the following standard.

- s (superior): The functional layer was dissolved or peeled, and the polyester film as the base material had no large damage, which was particularly practically favorable.
- a (good): A part of the functional layer was dissolved or peeled, which caused no practical problem.
- b (fair): A small part of the functional layer was dissolved or peeled.
- c (poor): The functional layer remained and caused a practical problem.

(2-2) Fluorescent X-Ray Analysis (Laminated Polyester Film Having Silicone Release Layer)

The surface of the cleaned laminated film was subjected to quantitative analysis of Si element with a fluorescent X-ray analyzer (XRF, "XRF-1800", produced by Shimadzu Corporation).

The removal rate of the functional layer was measured under assumption that the Si element amount on the surface of the laminated polyester film before cleaning was 100%, and the Si element amount of the plain film having no functional layer of the laminated film was 0%.

- s (superior): Removal rate of 90 to 100%
- a (good): Removal rate of 70 to 89%
- c (poor): Removal rate of 0 to 69%

(3) Intrinsic Viscosity 1 g of the polyester was precisely weighed and dissolved by adding 100 mL of a mixed solvent of phenol/tetrachloroethane=50/50 (mass ratio), and the intrinsic viscosity was measured at 30° C.

(Laminated Polyester Film having Functional Layer)

The following laminated polyester films having a functional layer (I) to (III) were prepared as specimens.

(I) Laminated Film (Laminated Polyester Film Having an Acrylic Pressure-Sensitive Adhesive Layer):

Commercially available product ("PET 75-H120 (10) Blue", produced by NEION Film Coatings Corporation), thickness of polyethylene terephthalate film: 75 μm, thickness of acrylic pressure-sensitive adhesive layer: 10 μm (II) Laminated Film (Laminated Polyester Film Having an Acrylic Hardcoat Layer):

A laminated polyester film having an acrylic hardcoat layer was obtained in the following manner.

(Preparation of Acrylic Hardcoat Solution)

24 parts by mass of dipentaerythritol hexaacrylate, 6 parts by mass of 2-hydroxy-3-phenoxypropyl acrylate, 1.5 parts by mass of a photopolymerization initiator (Omnirad 184, a trade name, produced by IGM Resins BV), and 70 parts by mass of toluene were mixed to provide a mixed coating liquid, which was designated as the acrylic hardcoat solution.

(Preparation of Acrylic Hardcoat Film)

The acrylic hardcoat solution was coated on a polyethylene terephthalate film (commercially available product, "Diafoil", produced by Mitsubishi Chemical Corporation) to a dry film thickness of approximately 9 μm, and cured through irradiation of an ultraviolet ray, so as to provide a laminated polyester film having an acrylic hardcoat layer.

(III) Laminated Film (Laminated Polyester Film Having a Silicone Release Layer):

Commercially available product ("MRF 38", produced by Mitsubishi Chemical Corporation), thickness of polyethylene terephthalate film: 38 μm, intrinsic viscosity of polyethylene terephthalate film: 0.67

Examples, Comparative Examples, Etc. of First Embodiment

Example 1-11

5 parts by mass of potassium hydroxide as the component (a), 40 parts by mass and 10 parts by mass respectively of benzyl alcohol and xylenol as the component (b), and 45 parts by mass of water as another component were mixed to prepare a cleaning agent (pH=13 or more).

The cleanability was evaluated with the laminated films (I) to (III) under the condition shown in Table 1. The results are shown in Table 1.

Example 1-2

5 parts by mass of potassium hydroxide, 5 parts by mass of sodium hydroxide, and 19 parts by mass of monoethanolamine as the component (a), 40 parts by mass of benzyl alcohol and 1 part by mass of propylene glycol as the component (b), and 30 parts by mass of water as another component were mixed to prepare a cleaning agent (pH=13 or more).

The cleanability was evaluated with the laminated films (I) to (III) under the condition shown in Table 1. The results are shown in Table 1.

The laminated film (III) was cleaned for an immersion time of 1 minute and a temperature condition of 60° C., and the intrinsic viscosity of the polyester film, from which the silicone release layer had been removed, was measured. As a result, the intrinsic viscosity was 0.67, which showed that the intrinsic viscosity of the polyester film was not changed before and after cleaning.

Example 1-3

5 parts by mass of potassium hydroxide, 5 parts by mass of sodium hydroxide, and 10 parts by mass of monoethanolamine as the component (a), 16 parts by mass of benzyl alcohol as the component (b), and 64 parts by mass of water as another component were mixed to prepare a cleaning agent (pH=13 or more).

The cleanability was evaluated with the laminated films (I) and (III) under the condition shown in Table 1. The results are shown in Table 1.

Example 1-4

5 parts by mass of potassium hydroxide as the component (a) and 95 parts by mass of benzyl alcohol as the component (b) were mixed to prepare a cleaning agent (pH=13 or more).

The cleanability was evaluated with the laminated films (I) and (III) under the condition shown in Table 1. The results are shown in Table 1.

Example 1-5

5 parts by mass of potassium hydroxide as the component (a) and 95 parts by mass of methanol as the component (b) were mixed to prepare a cleaning agent (pH=13 or more).

The cleanability was evaluated with the laminated film (III) under the condition shown in Table 1. The results are shown in Table 1.

Example 1-6

5 parts by mass of potassium hydroxide as the component (a) and 95 parts by mass of ethanol as the component (b) were dissolved in water to prepare a cleaning agent.

The cleanability was evaluated with the laminated films (I) and (III) under the condition shown in Table 1. The results are shown in Table 1.

Example 1-7

5 parts by mass of potassium hydroxide, 5 parts by mass of sodium hydroxide, and 17.9 parts by mass of monoethanolamine as the component (a), 33.8 parts by mass of benzyl alcohol, 3.8 parts by mass of methanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 1-8

5 parts by mass of potassium hydroxide, 5 parts by mass of sodium hydroxide, and 17.9 parts by mass of monoethanolamine as the component (a), 28.1 parts by mass of benzyl alcohol, 9.4 parts by mass of methanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 1-9

5 parts by mass of potassium hydroxide, 5 parts by mass of sodium hydroxide, and 17.9 parts by mass of monoethanolamine as the component (a), 18.8 parts by mass of benzyl alcohol, 18.8 parts by mass of methanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 1-10

5 parts by mass of potassium hydroxide, 5 parts by mass of sodium hydroxide, and 17.9 parts by mass of monoethanolamine as the component (a), 28.1 parts by mass of benzyl alcohol, 9.4 parts by mass of ethanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 1-11

5 parts by mass of potassium hydroxide, 5 parts by mass of sodium hydroxide, and 17.9 parts by mass of monoethanolamine as the component (a), 28.1 parts by mass of benzyl alcohol, 9.4 parts by mass of 2-propanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Comparative Example 1-1

30 parts by mass of potassium hydroxide as the component (a) and 70 parts by mass of water as another component were mixed to prepare a cleaning agent. The cleanability was evaluated with the laminated films (I) and (III) under the condition shown in Table 1. The results are shown in Table 1.

Comparative Example 1-2

The cleanability was evaluated in the same manner as in Comparative Example 1-1 except that the temperature condition was changed as shown in Table 1. The results are shown in Table 1.

As Reference Examples, a base material film (IV) having no functional layer (polyethylene terephthalate film, thickness: 52 μm) and a base material film (V) (unstretched polypropylene film, thickness: 56 μm) were prepared as specimens.

The specimen was immersed in the cleaning agent for 5 minutes, and the change of the thickness of the base material was measured by measuring the thickness with "Thickness Gauge ID-C112X/1012X", produced by Mitsutoyo Corporation.

The case where the thickness change was 3 μm or more was evaluated as A, and the case where the thickness change was less than 3 μm was evaluated as B.

Reference Example 1-1

The cleaning test of the base material film (IV) and the base material film (V) was performed by using a cleaning agent having the same composition as in Example 1-1 under the condition shown in Table 1, and the thickness after cleaning was measured. The results are shown in Table 1.

Reference Example 1-2

The cleaning test of the base material film (IV) and the base material film (V) was performed by using a cleaning agent having the same composition as in Example 1-2 under the condition shown in Table 1, and the thickness after cleaning was measured. The results are shown in Table 1.

TABLE 1

| | Cleaning condition | | Laminated polyester film | | | | Base material film | |
|---|---|---|---|---|---|---|---|---|
| | Temperature condition (° C.) | Immersion time (min) | (I) 5 × 5 cm | (II) 5 × 5 cm | 1 × 5 cm | (III) 5 × 5 cm | (IV) 5 × 5 cm | (V) 5 × 5 cm |
| Example 1-1 | room temperature (20) | 5 | | | | a | | |
| | 80 | 1 | s | | | s | | |
| | | 10 | | | b | | | |
| | | 20 | | a | a | | | |
| Example 1-2 | room temperature (20) | 5 | | | | s | | |
| | 60 | 1 | s | | | s | | |
| | | 10 | | | b | | | |
| | | 20 | | b | a | | | |
| Example 1-3 | 70 | 1 | a | | | s | | |
| Example 1-4 | 60 | 1 | s | | | s | | |
| Example 1-5 | 60 | 1 | | | | a | | |
| Example 1-6 | 60 | 5 | | | | s | | |
| | | 10 | s | | | | | |
| | 80 | 1 | | | | s | | |
| | | 10 | s | | | | | |
| Example 1-7 | 60 | 1 | | | | s | | |
| Example 1-8 | 60 | 1 | | | | s | | |
| Example 1-9 | 60 | 1 | | | | s | | |
| Example 1-10 | 60 | 1 | | | | s | | |
| Example 1-11 | 60 | 1 | | | | s | | |
| Comparative Example 1-1 | 90 | 1 | c | | | c | | |
| | | 5 | | | | c | | |
| | | 10 | c | | | | | |
| Comparative Example 1-2 | 60 | 1 | c | | | c | | |
| | | 5 | | | | c | | |
| | | 10 | c | | | | | |
| Reference Example 1-1 | 80 | 5 | | | | | A | B |
| Reference Example 1-2 | 60 | 5 | | | | | A | B |

Reference Example 1-3

For confirming the best mode of the monohydric alcohol compound in the cleaning agent, the cleanability was evaluated by the following standard for Examples 1-2, 1-7, 1-8, and 1-9 in which the cleaning condition was changed to a cleaning temperature of 40° C. and an immersion time of 1.2 minutes. The results are shown in Table 2.

The cleanability was evaluated by subjecting the surface of the laminated film after cleaning to the quantitative analysis of Si element with the fluorescent X-ray analyzer in the same manner as above.

The removal rate of the functional layer was judged by the following standard.

a (good): removal rate of 50 to 100% b (fair): removal rate of 0 to 49%

TABLE 2

| | | Hydro-phobic | Cleaning condition | | Laminated |
|---|---|---|---|---|---|
| | Evaluation target | alcohol/ water soluble alcohol | Temper-ature condition (° C.) | Immersion time (min) | polyester film (III) 5 × 5 cm |
| Reference Example 1-3 | Example 1-2 | — | 40 | 1.2 | B |
| | Example 1-7 | 9/1 | | | B |
| | Example 1-8 | 3/1 | | | A |
| | Example 1-9 | 1/1 | | | B |

As shown by the results in Table 1, according to the method of the first embodiment of the present invention, the functional layer can be peeled from any of the pressure-sensitive adhesive film, the hardcoat film, and the release film, and the polyester film can be recovered.

As shown by the results of Example 1-2, according to the method of the first embodiment of the present invention, the intrinsic viscosity (IV) of the polyester film is not changed before and after the removing step of the functional layer (cleaning step), and therefore, a recycled polyester product formed with the recovered polyester film as a raw material is highly possibly excellent in mechanical properties and the like.

As shown by the results of Examples 1-7 to 1-11, according to the method of the first embodiment of the present invention, it is understood that the combination use of two or more kinds of alcohol compounds as the compound having at least one hydroxy group enables peeling of the functional layer at a lower temperature for a shorter period of time, which are unlikely affects the film.

It is understood that Comparative Example 1-1 and Comparative Example 1-2 as the cleaning agent containing only the component (a) but not containing the component (b) do not exert the effects of the present invention.

As shown by the results of Reference Examples 1-1 and 1-2, it is understood that the base material film (IV) as the polyester film is thinned by melting a part of the surface thereof, and the base material film (V) having no ester bond is not thinned since the surface thereof is not melted.

Accordingly it is considered that the cleaning agent of the first embodiment of the present invention effectively peel the functional layer by dissolving a part of the surface of the polyester film as the base material.

As shown by the results of Reference Example 1-3 (Table 2), it is understood that a significantly excellent cleaning effect can be obtained by using a monohydric alcohol as the component (b) and regulating the mass ratio of hydrophobic alcohol/water soluble alcohol to 2/1 to 8/1.

Examples, Comparative Examples, Etc. of Second Embodiment

Example 2-1

5 parts by mass of potassium hydroxide and 5 parts by mass of sodium hydroxide as the component (a), 19 parts by mass of monoethanolamine as the component (c), 40 parts by mass of benzyl alcohol and 1 part by mass of propylene glycol as the component (b), and 30 parts by mass of water as another component were mixed to prepare a cleaning agent (pH=13 or more).

The cleanability was evaluated with the laminated films (I) to (III) under the condition shown in Table 3. The results are shown in Table 3.

The laminated film (III) was cleaned for an immersion time of 1 minute and a temperature condition of 60° C., and the intrinsic viscosity of the polyester film, from which the silicone release layer had been removed, was measured. As a result, the intrinsic viscosity was 0.67, which showed that the intrinsic viscosity of the polyester film was not changed before and after cleaning.

Example 2-21

5 parts by mass of potassium hydroxide and 5 parts by mass of sodium hydroxide as the component (a), 10 parts by mass of diethanolamine as the component (c), 16 parts by mass of benzyl alcohol as the component (b), and 64 parts by mass of water as another component were mixed to prepare a cleaning agent (pH=13 or more).

The cleanability was evaluated with the laminated films (I) and (III) under the condition shown in Table 3. The results are shown in Table 3.

Example 2-3

5 parts by mass of potassium hydroxide as the component (a), 17.6 parts by mass of sodium 2,4-dimethylbenzenesulfonate as the component (c), 41.3 parts by mass of benzyl alcohol as the component (b), and 36.1 parts by mass of water as another component were mixed to prepare a cleaning agent.

The cleanability was evaluated with the laminated film (III) under the condition shown in Table 3. The results are shown in Table 3.

Example 2-4

5 parts by mass of potassium hydroxide as the component (a), 17.6 parts by mass of sodium 2,4-dimethylbenzenesulfonate as the component (c), 37.2 parts by mass of benzyl alcohol and 4.1 parts by mass of methanol as the component (b), and 36.1 parts by mass of water as another component were mixed to prepare a cleaning agent.

The cleanability was evaluated with the laminated film (III) under the condition shown in Table 3. The results are shown in Table 3.

Example 2-5

5 parts by mass of potassium hydroxide as the component (a), 17.6 parts by mass of sodium 2,4-dimethylbenzenesulfonate as the component (c), 31.0 parts by mass of benzyl alcohol and 10.3 parts by mass of methanol as the component (b), and 36.1 parts by mass of water as another component were mixed to prepare a cleaning agent.

The cleanability was evaluated with the laminated film (III) under the condition shown in Table 3. The results are shown in Table 3.

Example 2-6

5 parts by mass of potassium hydroxide as the component (a), 17.6 parts by mass of sodium 2,4-dimethylbenzenesulfonate as the component (c), 20.7 parts by mass of benzyl alcohol and 20.7 parts by mass of methanol as the component (b), and 36.1 parts by mass of water as another component were mixed to prepare a cleaning agent.

The cleanability was evaluated with the laminated film (III) under the condition shown in Table 3. The results are shown in Table 3.

Example 2-7

5 parts by mass of potassium hydroxide as the component (a), 17.6 parts by mass of sodium 2,4-dimethylbenzenesulfonate as the component (c), 37.2 parts by mass of benzyl alcohol and 4.1 parts by mass of hexafluoro-2-propanol as the component (b), and 36.1 parts by mass of water as another component were mixed to prepare a cleaning agent.

The cleanability was evaluated with the laminated film (III) under the condition shown in Table 3. The results are shown in Table 3.

Comparative Example 2-1

30 parts by mass of potassium hydroxide as the component (a) and 70 parts by mass of water as another component were mixed to prepare a cleaning agent. The cleanability was evaluated with the laminated films (I) and (III) under the condition shown in Table 3. The results are shown in Table 3.

Comparative Example 2-2

The cleanability was evaluated in the same manner as in Comparative Example 2-1 except that the temperature condition was changed as shown in Table 3. The results are shown in Table 3.

As Reference Examples, a base material film (IV) having no functional layer (polyethylene terephthalate film, thickness: 52 μm) and a base material film (V) (unstretched polypropylene film, thickness: 56 μm) were prepared as specimens.

The specimen was immersed in the cleaning agent for 5 minutes, and the change of the thickness of the base material was measured by measuring the thickness with "Thickness Gauge ID-C112X/1012X", produced by Mitsutoyo Corporation.

The case where the thickness change was 3 μm or more was evaluated as A, and the case where the thickness change was less than 3 μm was evaluated as B.

Reference Example 2-1

The cleaning test of the base material film (IV) and the base material film (V) was performed by using a cleaning agent having the same composition as in Example 2-1 under the condition shown in Table 3, and the thickness after cleaning was measured. The results are shown in Table 3.

TABLE 3

| | Cleaning condition | | Laminated polyester film | | | | Base material film | |
|---|---|---|---|---|---|---|---|---|
| | Temperature condition (° C.) | Immersion time (min) | (I) 5 × 5 cm | (II) 5 × 5 cm | (II) 1 × 5 cm | (III) 5 × 5 cm | (IV) 5 × 5 cm | (V) 5 × 5 cm |
| Example 2-1 | room temperature (20) | 5 | | | | s | | |
| | 60 | 1 | s | | | s | | |
| | | 10 | | | b | | | |
| | | 20 | | b | a | | | |
| Example 2-2 | 70 | 1 | a | | | s | | |
| Example 2-3 | 80 | 1 | | | | s | | |
| Example 2-4 | 80 | 1 | | | | s | | |
| Example 2-5 | 80 | 1 | | | | s | | |
| Example 2-6 | 80 | 1 | | | | s | | |
| Example 2-7 | 80 | 1 | | | | s | | |
| Comparative Example 2-1 | 90 | 1 | c | | | c | | |
| | | 5 | | | | c | | |
| | | 10 | c | | | | | |
| Comparative Example 2-2 | 60 | 1 | c | | | c | | |
| | | 5 | | | | c | | |
| | | 10 | c | | | | | |
| Reference Example 2-1 | 80 | 5 | | | | | A | B |

Reference Example 2-2

For confirming the best mode of the monohydric alcohol compound in the cleaning agent, the cleanability was evaluated by the following standard for Examples 2-3 to 2-6 in which the cleaning condition was changed to a cleaning temperature of 55° C. and an immersion time of 1 minute. The results are shown in Table 4.

The cleanability was evaluated by subjecting the surface of the laminated film after cleaning to the quantitative analysis of Si element with the fluorescent X-ray analyzer in the same manner as above.

The removal rate of the functional layer was judged by the following standard.

a (good): removal rate of 50 to 100% b (fair): removal rate of 0 to 49%

TABLE 4

| | Evaluation target | Cleaning condition: Temperature condition (° C.) | Cleaning condition: Immersion time (min) | Laminated polyester film (III) 5 × 5 cm |
|---|---|---|---|---|
| Reference Example 2-2 | Example 2-3 | 55 | 1 | b |
| | Example 2-4 | | | a |
| | Example 2-5 | | | a |
| | Example 2-6 | | | b |

As shown by the results in Table 3, according to the method of the second embodiment of the present invention, the functional layer can be peeled from any of the pressure-sensitive adhesive film, the hardcoat film, and the release film, and the polyester film can be recovered.

As shown by the results of Example 2-1, according to the method of the second embodiment of the present invention, the intrinsic viscosity (IV) of the polyester film is not changed before and after the removing step of the functional layer (cleaning step), and therefore, a recycled polyester product formed with the recovered polyester film as a raw material is highly possibly excellent in mechanical properties and the like.

It is understood that Comparative Example 2-1 and Comparative Example 2-2 containing only the component (a) but not containing the component (b) as the cleaning agent do not exert the effects of the present invention.

As shown by the results of Reference Example 2-1, it is understood that the base material film (IV) as the polyester film is thinned by melting a part of the surface thereof, and the base material film (V) having no ester bond is not thinned since the surface thereof is not melted.

Accordingly it is considered that the cleaning agent of the second embodiment of the present invention effectively peel the functional layer by dissolving a part of the surface of the polyester film as the base material.

As shown by the results of Reference Example 2-2 (Table 4), according to the method of the second embodiment of the present invention, it is understood that the combination use of two or more kinds of alcohol compounds as the compound (b) having at least one hydroxy group enables peeling of the functional layer at a lower temperature for a shorter period of time, which are unlikely affects the film.

It is also understood that a significantly excellent cleaning effect can be obtained by regulating the mass ratio of hydrophobic alcohol/water soluble alcohol to 1.5/1 to 10/1.

Examples, Comparative Examples, Etc. of Third Embodiment

Example 3-1

40 parts by mass of benzyl alcohol and 10 parts by mass of xylenol as the component (b), 5 parts by mass of potassium hydroxide as the component (a), and 45 parts by mass of water as another component were mixed to prepare a cleaning agent (pH=13 or more).

The cleanability was evaluated with the laminated films (I) to (III) under the condition shown in Table 5. The results are shown in Table 5.

Example 3-2

40 parts by mass of benzyl alcohol and 1 part by mass of propylene glycol as the component (b), 5 parts by mass of potassium hydroxide, 5 parts by mass of sodium hydroxide, and 19 parts by mass of monoethanolamine as the component (a), and 30 parts by mass of water as another component were mixed to prepare a cleaning agent (pH=13 or more).

The cleanability was evaluated with the laminated films (I) to (III) under the condition shown in Table 5. The results are shown in Table 5.

The laminated film (III) was cleaned for an immersion time of 1 minute and a temperature condition of 60° C., and the intrinsic viscosity of the polyester film, from which the silicone release layer had been removed, was measured. As a result, the intrinsic viscosity was 0.67, which showed that the intrinsic viscosity of the polyester film was not changed before and after cleaning.

Example 3-3

16 parts by mass of benzyl alcohol as the component (b), 5 parts by mass of potassium hydroxide, 5 parts by mass of sodium hydroxide, and 10 parts by mass of diethanolamine as the component (a), and 64 parts by mass of water as another component were mixed to prepare a cleaning agent (pH=13 or more).

The cleanability was evaluated with the laminated films (I) and (III) under the condition shown in Table 5. The results are shown in Table 5.

Example 3-4

95 parts by mass of benzyl alcohol as the component (b) and 5 parts by mass of potassium hydroxide as the component (a) were mixed to prepare a cleaning agent (pH=13 or more).

The cleanability was evaluated with the laminated films (I) and (III) under the condition shown in Table 5. The results are shown in Table 5.

Example 3-5

95 parts by mass of methanol as the component (b) and 5 parts by mass of potassium hydroxide as the component (a) were mixed to prepare a cleaning agent (pH=13 or more).

The cleanability was evaluated with the laminated film (III) under the condition shown in Table 5. The results are shown in Table 5.

Example 3-6

95 parts by mass of ethanol as the component (b) and 5 parts by mass of potassium hydroxide as the component (a) were dissolved in water to prepare a cleaning agent.

The cleanability was evaluated with the laminated films (I) and (III) under the condition shown in Table 5. The results are shown in Table 5.

Example 3-7

33.8 parts by mass of benzyl alcohol, 3.8 parts by mass of hexafluoro-2-propanol, and 2.9 parts by mass of propylene glycol as the component (b), 5 parts by mass of potassium hydroxide, 5 parts by mass of sodium hydroxide, and 17.9 parts by mass of monoethanolamine as the component (a), and 31.6 parts by mass of water as another component were mixed to prepare a cleaning agent.

The cleanability was evaluated with the laminated film (III) under the condition shown in Table 5. The results are shown in Table 5.

Example 3-8

28.1 parts by mass of benzyl alcohol, 9.4 parts by mass of hexafluoro-2-propanol, and 2.9 parts by mass of propylene glycol as the component (b), 5 parts by mass of potassium hydroxide, 5 parts by mass of sodium hydroxide, and 17.9 parts by mass of monoethanolamine as the component (a), and 31.6 parts by mass of water as another component were mixed to prepare a cleaning agent.

The cleanability was evaluated with the laminated film (III) under the condition shown in Table 5. The results are shown in Table 5.

Example 3-9

18.8 parts by mass of benzyl alcohol, 18.8 parts by mass of hexafluoro-2-propanol, and 2.9 parts by mass of propylene glycol as the component (b), 5 parts by mass of potassium hydroxide, 5 parts by mass of sodium hydroxide, and 17.9 parts by mass of monoethanolamine as the component (a), and 31.6 parts by mass of water as another component were mixed to prepare a cleaning agent.

The cleanability was evaluated with the laminated film (III) under the condition shown in Table 5. The results are shown in Table 5.

Comparative Example 3-1

30 parts by mass of potassium hydroxide as the component (a) and 70 parts by mass of water as another component were mixed to prepare a cleaning agent. The cleanability was evaluated with the laminated films (I) and (III) under the condition shown in Table 5. The results are shown in Table 5.

Comparative Example 3-21

The cleanability was evaluated in the same manner as in Comparative Example 3-1 except that the temperature condition was changed as shown in Table 5. The results are shown in Table 5.

As Reference Examples, a base material film (IV) having no functional layer (polyethylene terephthalate film, thickness: 52 μm) and a base material film (V) (unstretched polypropylene film, thickness: 56 μm) were prepared as specimens.

The specimen was immersed in the cleaning agent for 5 minutes, and the change of the thickness of the base material was measured by measuring the thickness with "Thickness Gauge ID-C112X/1012X", produced by Mitsutoyo Corporation.

The case where the thickness change was 3 μm or more was evaluated as A, and the case where the thickness change was less than 3 μm was evaluated as B.

Reference Example 3-1

The cleaning test of the base material film (IV) and the base material film (V) was performed by using a cleaning agent having the same composition as in Example 3-1 under the condition shown in Table 6, and the thickness after cleaning was measured. The results are shown in Table 6.

Reference Example 3-2

The cleaning test of the base material film (IV) and the base material film (V) was performed by using a cleaning agent having the same composition as in Example 3-2 under the condition shown in Table 6, and the thickness after cleaning was measured. The results are shown in Table 6.

TABLE 5

| | Cleaning condition | | Laminated polyester film | | | | Base material film | |
|---|---|---|---|---|---|---|---|---|
| | Temperature condition (° C.) | Immersion time (min) | (I) 5 × 5 cm | (II) 5 × 5 cm | (II) 1 × 5 cm | (III) 5 × 5 cm | (IV) 5 × 5 cm | (V) 5 × 5 cm |
| Example 3-1 | room temperature (20) | 5 | | | | a | | |
| | 80 | 1 | s | | | s | | |
| | | 10 | | | b | | | |
| | | 20 | | a | a | | | |
| Example 3-2 | room temperature (20) | 5 | | | | s | | |
| | 60 | 1 | s | | | s | | |
| | | 10 | | | b | | | |
| | | 20 | | b | a | | | |
| Example 3-3 | 70 | 1 | a | | | s | | |
| Example 3-4 | 60 | 1 | s | | | s | | |
| Example 3-5 | 60 | 1 | | | | a | | |
| Example 3-6 | 60 | 5 | | | | s | | |
| | | 10 | s | | | | | |
| | 80 | 1 | | | | s | | |
| | | 10 | s | | | | | |

TABLE 5-continued

| | Cleaning condition | | Laminated polyester film | | | | Base material film | |
|---|---|---|---|---|---|---|---|---|
| | Temperature condition (° C.) | Immersion time (min) | (I) 5 × 5 cm | (II) 5 × 5 cm | 1 × 5 cm | (III) 5 × 5 cm | (IV) 5 × 5 cm | (V) 5 × 5 cm |
| Example 3-7 | 60 | 1 | | | | s | | |
| Example 3-8 | 60 | 1 | | | | s | | |
| Example 3-9 | 60 | 1 | | | | s | | |
| Comparative Example 3-1 | 90 | 1 | c | | | c | | |
| | | 5 | | | | c | | |
| | | 10 | c | | | | | |
| Comparative Example 3-2 | 60 | 1 | c | | | c | | |
| | | 5 | | | | c | | |
| | | 10 | c | | | | | |
| Reference Example 3-1 | 80 | 5 | | | | | A | B |
| Reference Example 3-2 | 60 | 5 | | | | | A | B |

Reference Example 3-3

For confirming the best mode of the alcohol compound in the cleaning agent, the cleanability was evaluated by the following standard for Examples 3-2, 3-7, 3-8, and 3-9 in which the cleaning condition was changed to a cleaning temperature of 40° C. and an immersion time of 1.2 minutes. The results are shown in Table 6.

The cleanability was evaluated by subjecting the surface of the laminated film after cleaning to the quantitative analysis of Si element with the fluorescent X-ray analyzer in the same manner as above.

The removal rate of the functional layer was judged by the following standard.

a (good): removal rate of 50 to 100% b (fair): removal rate of 0 to 49%

TABLE 6

| | | Cleaning condition | | Laminated |
|---|---|---|---|---|
| | Evaluation target | Temperature condition (° C.) | Immersion time (min) | polyester film (III) 5 × 5 cm |
| Reference Example 3-3 | Example 3-2 | 40 | 1.2 | b |
| | Example 3-7 | | | a |
| | Example 3-8 | | | b |
| | Example 3-9 | | | b |

As shown by the results in Table 5, according to the method of the third embodiment of the present invention, the functional layer can be peeled from any of the pressure-sensitive adhesive film, the hardcoat film, and the release film, and the polyester film can be recovered.

As shown by the results of Example 3-2, according to the method of the third embodiment of the present invention, the intrinsic viscosity (IV) of the polyester film is not changed before and after the removing step of the functional layer (cleaning step), and therefore, a recycled polyester product formed with the recovered polyester film as a raw material is highly possibly excellent in mechanical properties and the like.

As shown by the results of Examples 3-7, 3-8, and 3-9, according to the method of the third embodiment of the present invention, it is understood that in the case where two or more kinds of alcohol compounds having an acidity constant (pKa) of 8.0 or more and 20.0 or less are used in combination, in which at least one kind thereof has an acidity constant (pKa) of 9.0 or more and 10.0 or less, the functional layer can be peeled at a lower temperature for a shorter period of time, which are unlikely affects the film.

It is understood that Comparative Examples 3-1 and 3-2 not containing an alcohol compound having an acidity constant (pKa) of 8.0 or more and 20.0 or less as the cleaning agent do not exert the effects of the present invention.

As shown by the results of Reference Examples 3-1 and 3-2, it is understood that the base material film (IV) as the polyester film is thinned by melting a part of the surface thereof, and the base material film (V) having no ester bond is not thinned since the surface thereof is not melted.

Accordingly it is considered that the cleaning agent of the third embodiment of the present invention effectively peel the functional layer by dissolving a part of the surface of the polyester film as the base material.

As shown by the results of Reference Example 3-3 (Table 6), it is understood that a significantly excellent cleaning effect can be obtained in the case where assuming that the monohydric alcohol compound having an acidity constant (pKa) of 9.0 or more and 10.0 or less is an alcohol compound A, and the monohydric alcohol compound having an acidity constant (pKa) of 8.0 or more and 20.0 or less is an alcohol compound B, the mass ratio of alcohol compound A/alcohol compound B (except for the alcohol compound A) is 1/5 to 1/10.

As shown above, according to the present invention, various functional layers can be peeled with one kind of a cleaning agent, and therefore, even though the laminated polyester film has multiple different functional layers, all the functional layers can be peeled with one liquid.

Furthermore, for example, even though the laminated polyester film has a hardcoat layer on the front surface thereof and a pressure-sensitive adhesive layer on the back surface thereof, the functional layers on both surfaces can be peeled to recover the polyester film as the base material through a single cleaning operation.

The invention claimed is:

1. A polyester film recovery method comprising:

removing a functional layer through cleaning a laminated polyester film including a polyester film having the functional layer on a surface of the polyester film, with a cleaning agent; and recovering the polyester film, from which the functional layer has been removed wherein the functional layer comprises at least one selected from the group consisting of a hard coat layer, a pressure-sensitive adhesive layer, a release layer, a decorative layer, a light shielding layer, an ultraviolet ray shielding layer, an adhesion promoting layer, an antistatic layer, a refractive index regulating layer, and an oligomer blocking layer, the functional layer and the polyester film are directly in contact to each other before the removing, the cleaning agent comprises a compatibilizing agent (c), and the compatibilizing agent (c) comprises at least one selected from the group consisting of an aromatic sulfonate salt and a hydroxy group-containing amine compound.

2. The polyester film recovery method according to claim 1, wherein the cleaning agent further comprises an alkalinizing agent (a) so as to remove the functional layer.

3. The polyester film recovery method according to claim 2, wherein the cleaning agent further contains a compound (b) having at least one hydroxy group.

4. The polyester film recovery method according to claim 3, wherein the compound (b) having at least one hydroxy group comprises an alcohol compound.

5. The polyester film recovery method according to claim 4, wherein the alcohol compound has an acidity constant (pKa) of 8.0 or more and 20.0 or less.

6. The polyester film recovery method according to claim 4, wherein the alcohol compound has an acidity constant (pKa) of 10.0 or more and 20.0 or less.

7. The polyester film recovery method according to claim 4, wherein two or more of the alcohol compounds are used in combination.

8. The polyester film recovery method according to claim 2, wherein the alkalinizing agent (a) contains an alkali metal hydroxide.

9. The polyester film recovery method according to claim 8, wherein the alkali metal hydroxide contains potassium hydroxide.

10. The polyester film recovery method according to claim 1, wherein the cleaning agent further comprises an alcohol compound having an acidity constant (pKa) of 8.0 or more and 20.0 or less, so as to remove the functional layer.

11. The polyester film recovery method according to claim 10, wherein the cleaning agent further contains an alkalinizing agent (a).

12. The polyester film recovery method according to claim 1, wherein two or more of the alcohol compounds are used in combination, and at least one of the alcohol compounds has an acidity constant (pKa) of 9.0 or more and 10.0 or less.

13. The polyester film recovery method according to claim 1, wherein the cleaning agent is an aqueous cleaning agent.

14. The polyester film recovery method according to claim 1, wherein the cleaning agent in the removing the functional layer has a temperature of 20° C. or more.

15. A recycled polyester product comprising as at least a part of a raw material thereof a polyester film recovered by the recovery method according to claim 1.

16. The polyester film recovery method according to claim 1, wherein the cleaning agent comprises an alkalinizing agent (a) and a compound (b) having at least one hydroxy group, so as to remove the functional layer.

17. The polyester film recovery method according to claim 16, wherein the compound (b) having at least one hydroxy group comprises an alcohol compound.

18. The polyester film recovery method according to claim 17, wherein the alcohol compound has an acidity constant (pKa) of 8.0 or more and 20.0 or less.

19. The polyester film recovery method according to claim 17, wherein the alcohol compound has an acidity constant (pKa) of 10.0 or more and 20.0 or less.

20. The polyester film recovery method according to claim 17, wherein two or more of the alcohol compounds are used in combination.

21. The polyester film recovery method according to claim 16, wherein the alkalinizing agent (a) contains an alkali metal hydroxide.

22. The polyester film recovery method according to claim 21, wherein the alkali metal hydroxide contains potassium hydroxide.

23. The polyester film recovery method according to claim 1, wherein the functional layer is a single layer.

24. The polyester film recovery method according to claim 1, wherein the hardcoat layer includes at least one hardened material selected from the group consisting of a monofunctional (meth)acrylate, a polyfunctional (meth)acrylate, and tetraethoxysilane, the pressure-sensitive adhesive layer includes at least one selected from the group consisting of acrylic resin, a rubber resin, and a silicone resin, the release layer comprises at least one selected from the group consisting of a curable silicone resin, a long-chain alkyl group-containing compound, a modified silicone resin obtained through graft polymerization with a urethane resin, an epoxy resin, a fluorine compound, and hydrocarbon wax, the decorative layer comprises at least one selected from the group consisting of a polyurethane resin, a vinyl resin, a polyamide resin, a polyester resin, an acrylic resin, and a polyvinyl acetal resin, the light shielding layer or the ultraviolet ray shielding layer comprises at least inorganic filler and an organic filler, the adhesion promoting layer comprises at least one selected from the group consisting of a polyurethane resin, a vinyl resin, a polyamide resin, a polyester resin, an acrylic resin, and a polyvinyl acetal resin, the antistatic layer comprises at least one selected from the group consisting of a surfactant, a conductive polymer, graphene, carbon black, and carbon nanotubes (CNT), the refractive index regulating layer comprises at least one selected from the group consisting of a polyester resin, an acrylic resin, a urethane resin, a polycarbonate resin, an epoxy resin, an alkyd resin, a urea resin, a fluorine resin, and a metal oxide, and the oligomer blocking layer comprises an amine compound and an ionic resin.

* * * * *